US012714888B1

(12) United States Patent
Minogue et al.

(10) Patent No.: US 12,714,888 B1
(45) Date of Patent: Aug. 25, 2026

(54) PORTABLE GAS DELIVERY DEVICE

(71) Applicant: Minogue Consulting, LLC, Boston, MA (US)

(72) Inventors: Michael R. Minogue, Boston, MA (US); Anne-Marie Freeley, Boston, MA (US)

(73) Assignee: Minogue Consulting, LLC, Boston, MA (US)

( * ) Notice: Subject to any disclaimer, the term of this patent is extended or adjusted under 35 U.S.C. 154(b) by 0 days.

(21) Appl. No.: 19/323,403

(22) Filed: Sep. 9, 2025

Related U.S. Application Data

(60) Provisional application No. 63/853,011, filed on Jul. 29, 2025.

(51) Int. Cl.
*A62B 7/02* (2006.01)
*A62B 9/00* (2006.01)
(Continued)

(52) U.S. Cl.
CPC ................ *A62B 7/02* (2013.01); *A62B 9/006* (2013.01); *A62B 9/02* (2013.01); *A62B 9/06* (2013.01)

(58) Field of Classification Search
CPC .. A61M 11/006; A61M 11/007; A61M 11/02; A61M 11/042; A61M 11/06; A61M 15/002; A61M 15/0021; A61M 15/0065; A61M 15/008; A61M 15/009; A61M 15/0091; A61M 15/0093; A61M 15/0098; A61M 15/08; A61M 16/0051; A61M 16/0078; A61M 16/0084; A61M 16/0093; A61M 16/01; A61M 16/024; A61M 16/0434; A61M 16/049; A61M 16/0493; A61M 16/0495; A61M 16/0497;
(Continued)

(56) References Cited

U.S. PATENT DOCUMENTS 733,027 A * 7/1903 Goldan ................ A61M 16/18 128/203.28
3,667,463 A * 6/1972 Barnes ................ A61M 16/16 261/DIG. 65
(Continued)

OTHER PUBLICATIONS

International Search Report and Written Opinion corresponding to PCT Application No. PCT/US2024/056306, issued Jan. 31, 2025.

*Primary Examiner* — Annette Dixon
(74) *Attorney, Agent, or Firm* — Meagher Emanuel Laks Goldberg & Liao LLP

(57) ABSTRACT

The present disclosure provides a device for delivering gas to a user comprising: a coupling portion configured to be directly coupled to a portable gas container and a manifold configured to be directly coupled to the coupling portion. The manifold may include: a primary inlet port configured to allow the gas from the portable gas container to flow into manifold; a primary outlet port in fluid communication with the primary inlet port and configured to direct a gas from the portable gas container towards a user; a secondary inlet port in fluid communication with the primary outlet port and configured to allow a secondary gas source to be coupled to the manifold; and an additional port in fluid communication with at least the primary inlet port. A grommet seal and/or a disc or umbrella valve may be positioned at least partially within the primary inlet port.

30 Claims, 18 Drawing Sheets

(51) Int. Cl.
*A62B 9/02* (2006.01)
*A62B 9/06* (2006.01)

(58) Field of Classification Search
CPC .. A61M 16/06; A61M 16/0677; A61M 16/08; A61M 16/0816; A61M 16/0825; A61M 16/0833; A61M 16/085; A61M 16/10; A61M 16/101; A61M 16/104; A61M 16/1045; A61M 16/1055; A61M 16/107; A61M 16/127; A61M 16/18; A61M 16/208; A61M 16/209; A61M 2016/0021; A61M 2016/0027; A61M 2016/0039; A61M 2016/1035; A61M 2025/022; A61M 2025/0253; A61M 2025/0273; A61M 2039/2493; A61M 2202/0007; A61M 2202/0208; A61M 2202/03; A61M 2202/064; A61M 2202/30; A61M 2205/071; A61M 2205/075; A61M 2205/3368; A61M 2205/3386; A61M 2205/3389; A61M 2205/3653; A61M 2205/502; A61M 2205/505; A61M 2205/581; A61M 2205/582; A61M 2205/6045; A61M 2205/6081; A61M 2205/8206; A61M 2205/8225; A61M 2210/065; A61M 2230/04; A61M 2230/06; A61M 2230/205; A61M 2230/30; A61M 2230/432; A61M 2230/437; A61M 25/02; A61M 39/24; F16K 15/148; F16K 17/19; Y10S 128/26; Y10S 128/912; Y10T 137/778; Y10T 137/7842; Y10T 137/789; Y10T 137/7897
See application file for complete search history.

(56) References Cited

U.S. PATENT DOCUMENTS

| | | | | |
|---|---|---|---|---|
| 3,717,147 | A * | 2/1973 | Flynn | A61M 16/127 128/204.25 |
| 4,502,502 | A * | 3/1985 | Krug | F16K 15/148 137/526 |
| 4,821,713 | A * | 4/1989 | Bauman | A61M 16/0084 128/205.24 |
| 5,062,420 | A * | 11/1991 | Levine | A61M 16/0816 128/207.14 |
| 5,743,885 | A * | 4/1998 | Hoerby | A61M 25/02 604/179 |
| 6,125,844 | A * | 10/2000 | Samiotes | A61M 15/0065 128/200.23 |
| 6,631,713 | B1 | 10/2003 | Christopher | |
| 7,051,731 | B1 * | 5/2006 | Rogerson | A61M 15/009 128/207.14 |
| 8,181,650 | B2 * | 5/2012 | Nelson | A61M 16/107 128/204.24 |
| 12,090,276 | B1 * | 9/2024 | Minogue | A61M 16/208 |
| 2003/0189492 | A1 * | 10/2003 | Harvie | A61M 16/0051 340/611 |
| 2007/0039614 | A1 * | 2/2007 | Djupesland | A61M 15/009 424/45 |
| 2013/0090705 | A1 | 4/2013 | Bange et al. | |
| 2013/0118484 | A1 * | 5/2013 | Ishikita | A61M 16/01 128/200.14 |
| 2017/0023879 | A1 | 1/2017 | Murata | |
| 2017/0033364 | A1 | 2/2017 | Kim | |
| 2020/0019764 | A1 | 1/2020 | Sun et al. | |
| 2020/0030643 | A1 | 1/2020 | Griffiths | |
| 2022/0008674 | A1 * | 1/2022 | Sharp | A61M 16/201 |
| 2025/0152889 | A1 * | 5/2025 | Minogue | A61M 16/0627 |

* cited by examiner

PORTABLE GAS DELIVERY DEVICE

CROSS-REFERENCE TO RELATED APPLICATIONS

The present application claims priority to U.S. Provisional Patent Application 63/853,011, filed Jul. 29, 2025, the contents of which are incorporated by reference herein in its entirety.

TECHNICAL FIELD

The present disclosure relates to portable gas delivery devices, and more particularly to a portable gas delivery device for controlled gas administration in medical and non-medical settings.

BACKGROUND

Gas delivery devices play a crucial role in various medical and emergency situations. These devices are used to provide supplemental oxygen or other therapeutic gases to patients in need. Portable gas delivery systems have become increasingly important due to their ability to provide immediate care in diverse settings, from hospitals to remote locations.

Traditional gas delivery systems often rely on large, stationary tanks or wall-mounted units, limiting their mobility and accessibility. This limitation can be problematic in emergency situations or when treating patients outside of healthcare facilities. Additionally, many existing portable systems are bulky, complex to operate, or have limited gas capacity, which can hinder their effectiveness in certain scenarios.

The design of gas delivery devices involves several considerations, including ease of use, portability, gas flow control, and patient interface. Ensuring proper sealing and controlled gas release is essential for efficient and safe operation. Furthermore, the ability to adapt to different patient needs and incorporate various accessories can enhance the versatility of these devices.

One challenge in portable gas delivery systems is balancing the need for a compact design with sufficient gas capacity to provide adequate treatment. Another consideration is the ease of refilling or replacing gas containers, which can affect the device's usability in different settings.

As medical technology advances, there is an ongoing effort to improve portable gas delivery systems. These improvements aim to enhance portability, increase ease of use, and provide more precise control over gas delivery. Additionally, there is a focus on developing systems that can be quickly deployed and operated by both medical professionals and laypersons in emergency situations.

The integration of safety features, such as pressure regulation and flow control mechanisms, is another area of development in gas delivery devices. These features help prevent overdelivery of gas and ensure consistent, appropriate dosing for patients.

Advancements in materials and manufacturing techniques have also contributed to the evolution of portable gas delivery systems. These advancements have led to lighter, more durable devices that can withstand the rigors of various environments while maintaining reliability.

As the demand for portable medical devices continues to grow, the development of improved gas delivery systems remains an active area of research and innovation. These efforts aim to address the diverse needs of patients and healthcare providers across a wide range of medical and emergency scenarios.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a device for delivering gas to a user is provided. The device may include a coupling portion configured to be directly coupled to a portable gas container. The device may include a manifold configured to be directly coupled to the coupling portion. The manifold may include a primary outlet port configured to direct a gas from the portable gas container towards a user. The manifold may include a primary inlet port configured to allow the gas from the portable gas container to flow into the manifold, the primary inlet port being in fluid communication with the primary outlet port. The manifold may include a secondary inlet port configured to allow a secondary gas source to be coupled to the manifold, the secondary inlet port being in fluid communication with the primary outlet port. The manifold may include an additional port in fluid communication with at least the primary inlet port. The device may include a grommet seal and/or a disc or umbrella valve at least partially within the primary inlet port. The device may include a selectable gas release component that is configured to controllably engage a valve of the portable gas container. The selectable gas release component may extend through a sidewall of the manifold. In certain implementations, a portion of the selectable gas release component may extend through a central opening of the grommet seal.

According to other aspects of the present disclosure, the device may include one or more of the following features. The device may include a first cap removably coupled to the additional port. The device may include a patient interaction component operably coupled to the primary outlet port. The patient interaction component may be a mask configured to be disposed over at least a portion of a patient's face. The mask may be directly coupled to the primary outlet port. The mask may be indirectly coupled to the primary outlet port via one or more tubes. The mask may utilize a flexible film configured to be pressed against a patient's face, the flexible film forming a portion of an air pathway extending through the mask. The patient interaction component may be a mouthpiece. The mouthpiece may include a gas inlet configured to receive a first gas flow from the portable gas container, a gas outlet through which gas can flow out of the mouthpiece and into a mouth of a person when the mouthpiece is placed into the mouth of the person, and at least a right rear teeth engagement element and a left rear teeth engagement element. The right rear teeth engagement element and left rear teeth engagement element may be separated from each other such that no portion of the right rear teeth engagement element is in contact with any portion of the left rear teeth engagement element. The mouthpiece may be directly coupled to the primary outlet port. The mouthpiece may be indirectly coupled to the primary outlet port via a swiveling component coupled to the primary outlet port. A spring-like feature may be coupled to the mouthpiece to compress the mouthpiece in a first configuration, and allow the mouthpiece to expand in a second configuration.

The device may further include adhesive disposed at or near a proximal end of the mouthpiece orthogonal to a direction of air flow into the mouthpiece, such that when the mouthpiece is inserted into a mouth of a patient, the adhesive can engage skin of the patient to maintain a seal around the mouth. The device may include a removable film disposed over adhesive on a surface of the adhesive facing away from the manifold. The patient interaction component may be a laryngeal mask airway (LMA) or oropharyngeal airway. A stem valve of the portable gas container may be coaxial with the central opening of the gasket seal ring. An external channel of the gasket seal ring may be configured to fit around edges of an internal wall within the primary inlet port that define an opening for gas from the portable gas container to enter the manifold.

The manifold may be removably coupled to the coupling portion. An external surface of either the manifold or the coupling portion may include threads for removably coupling the manifold to the coupling portion. The device may include an O-ring between the manifold and the coupling portion. The manifold may include a first opening in a sidewall of the manifold at or near the primary inlet port for receiving an end of the selectable gas release component, a second opening in the sidewall opposite the first opening, the second opening configured to allow an intermediate portion of the selectable gas release component to pass through the sidewall. The first opening may include two openings through the sidewall. The device may include a second cap removably coupled to the secondary inlet port. The device may include a one-way valve removably coupled to the secondary inlet port. The device may include a duckbill valve disposed within the primary outlet port.

The device may include a pressure gauge operably coupled to the primary outlet port. The pressure gauge may be a spring pressure gauge. The device may include a pressure relief valve operably coupled to the primary outlet port. The coupling portion may include a top portion defining a top opening having a first diameter, and a bottom portion defining a bottom opening having a second diameter, the second diameter being larger than the first diameter, wherein the bottom opening includes an engagement mechanism configured to engage the portable gas container to prevent the coupling portion from rotating relative to the portable gas container. The engagement mechanism may include one or more teeth, one or more crimped portions, one or more roughened surfaces, or having the second diameter be smaller than a maximum diameter of the portable gas container. The first cap may comprise a Positive End Expiratory Pressure (PEEP) valve. The device may include an O-ring disposed between the selectable gas release component and a valve stem of the gas container. The device may include an oxygen port operably coupled to the manifold at or near the secondary inlet port, the oxygen port configured to be operably coupled to an oxygen supply. The device may include a ventilation and/or respiration detector configured to indicate when ventilation and/or respiration has taken place. The ventilation and/or respiration detector may be configured to detect a substance. The substance being detected may be $CO_2$.

According to another aspect of the present disclosure, a method of delivering a gas to a user or a treated person or patient is provided. The method includes providing a device as described in any of the preceding aspects to a patient, and interacting with the selectable gas release component to cause the gas to be released from the portable gas container and to flow through the primary inlet port and out of the primary outlet port towards the patient.

According to other aspects of the present disclosure, the method may include one or more of the following features. The method may include coupling a source of a gas to the secondary inlet port. The method may include decoupling the portable gas container from the device after the source of the gas has been coupled to the secondary inlet port. The device may include a mouthpiece and mouth tape, and the method may further include sealing the mouth tape over a mouth of the patient after the mouthpiece is inserted into the mouth of the patient. The grommet seal may remain in contact with a trigger stem of the selectable gas release component throughout activation, preventing gas from the gas container escaping through the primary inlet port. The method may include detaching the portable gas container from the primary inlet port of the device and attaching a second portable gas container to the primary inlet port.

According to another aspect of the present disclosure, a method of treatment is provided. The method includes providing a device as described in any of the preceding aspects, where the device further includes a cap or a one-way valve coupled to the secondary inlet port. The method also includes delivering rescue breaths to a patient through the secondary inlet port, either through the one-way valve or after removing the cap.

According to other aspects of the present disclosure, the method may include interacting with the selectable gas release component simultaneous with delivering rescue breaths in order to increase an amount of a breathable gas delivered to the patient.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to a device for delivering gas to a user. The device may be portable and configured to provide a breathable gas to a user in various situations. In some cases, the device may be used for emergency medical treatment, respiratory support, or other applications where controlled gas delivery is desired. The device may include features that allow for efficient and precise gas administration, while maintaining portability and ease of use. In some cases, the device may be designed to interface with different types of gas sources and patient interaction components, providing flexibility in its application. The device may incorporate mechanisms for controlling gas flow, monitoring pressure, and ensuring proper sealing during operation. In some cases, the device may be configured to allow for quick setup and operation by users with varying levels of medical training.

Figure 1:
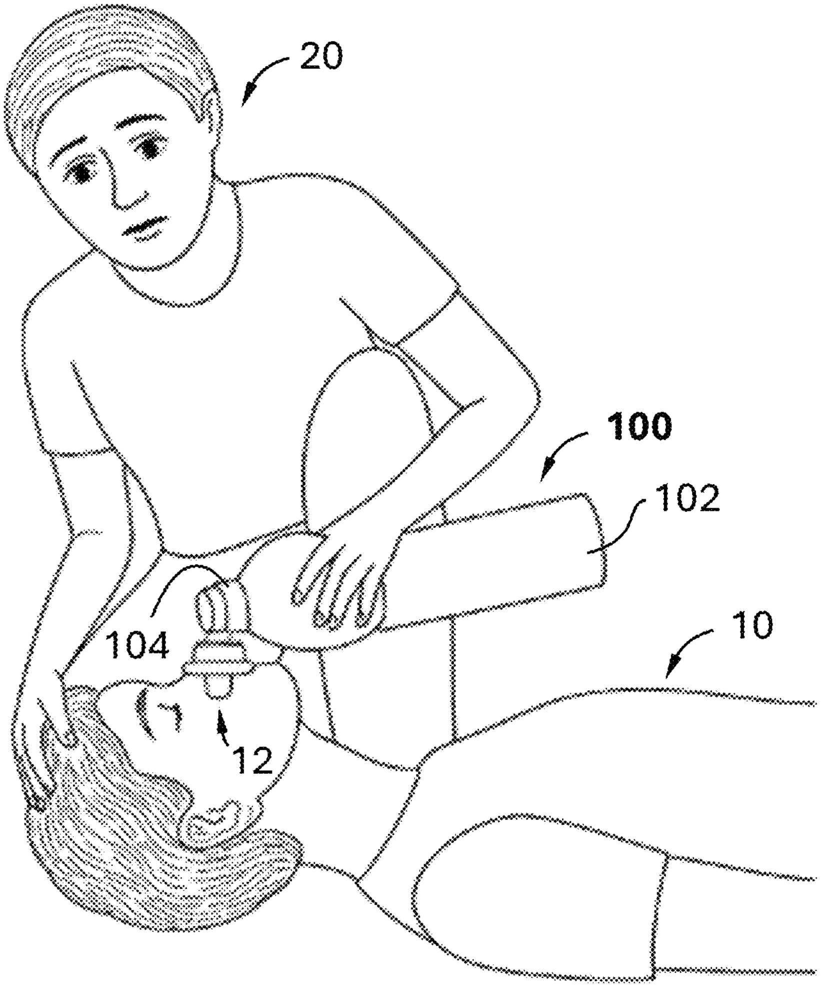
FIG. 1 illustrates a side view of a gas delivery device in use with a patient, according to aspects of the present disclosure.

The gas delivery device 100 may be a portable system designed for delivering breathable gas to a user. As shown in FIG. 1, the gas delivery device 100 may include a portable gas container 102 operably coupled to a mouthpiece or mask 104.

The portable gas container 102 preferably weighs less than 2.5 pounds when filled with a breathable gas. In some implementations, the breathable gas may include a gas containing at least 90% oxygen ($O_2$ molecules). In some implementations, the breathable gas may include air (e.g., ~78% nitrogen, ~21% oxygen, ~1% argon and trace gases), or oxygen-enriched air (e.g., air with 22-40% oxygen). In some implementations, the breathable gas may include a specialty gas mixture, such as heliox (a mixture of helium and oxygen), trimix (helium, nitrogen, and oxygen), hydreliox (hydrogen, helium, and oxygen), or cabrogen (e.g., 1-7% carbon dioxide+oxygen). In some implementations, the breathable gas may include a gas containing a pharmaceutically acceptable drug. For example, the breathable gas could include a bronchodilator (such as albuterol, levalbuterol, tiotropium, etc.), a corticosteroid (such as budesonide, fluticasone, beclomethasone, etc.), antibiotics or antivirals (such as tobramycin, ribavirin, etc.), or a mucolytic (such as hypertonic saline, acetylcysteine, etc.). As will be understood, the portable gas container may contain any appropriate interface for allowing gas to be sealed inside a container. For example, e.g., the container may include a valve mounting cup 302 with a valve stem 304 (see FIG. 3), that allows for controllable dispensing of the gas through the valve stem.

Figure 2:
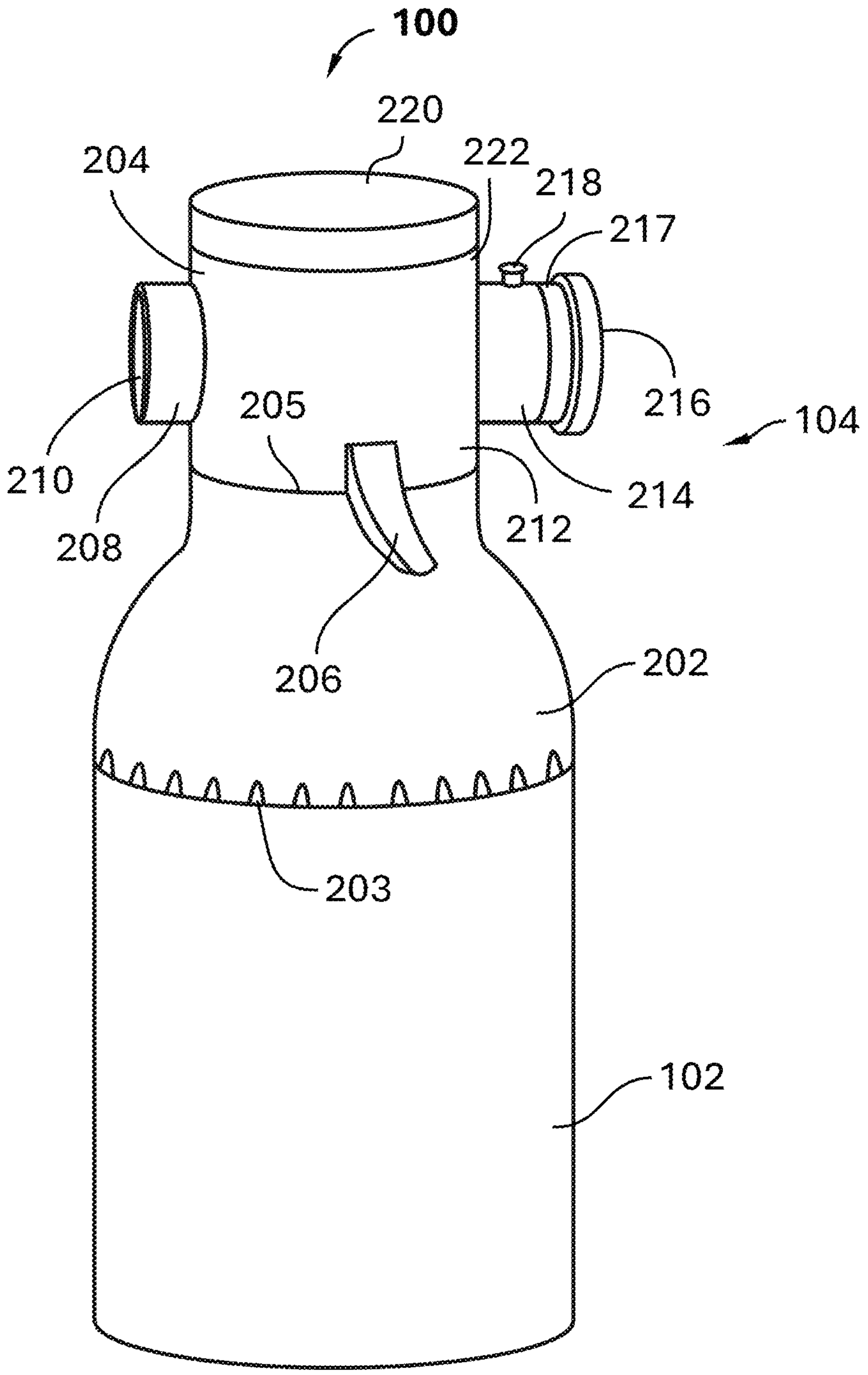
FIG. 2 depicts an orthogonal view of a gas delivery device, according to an embodiment.
Figure 3:
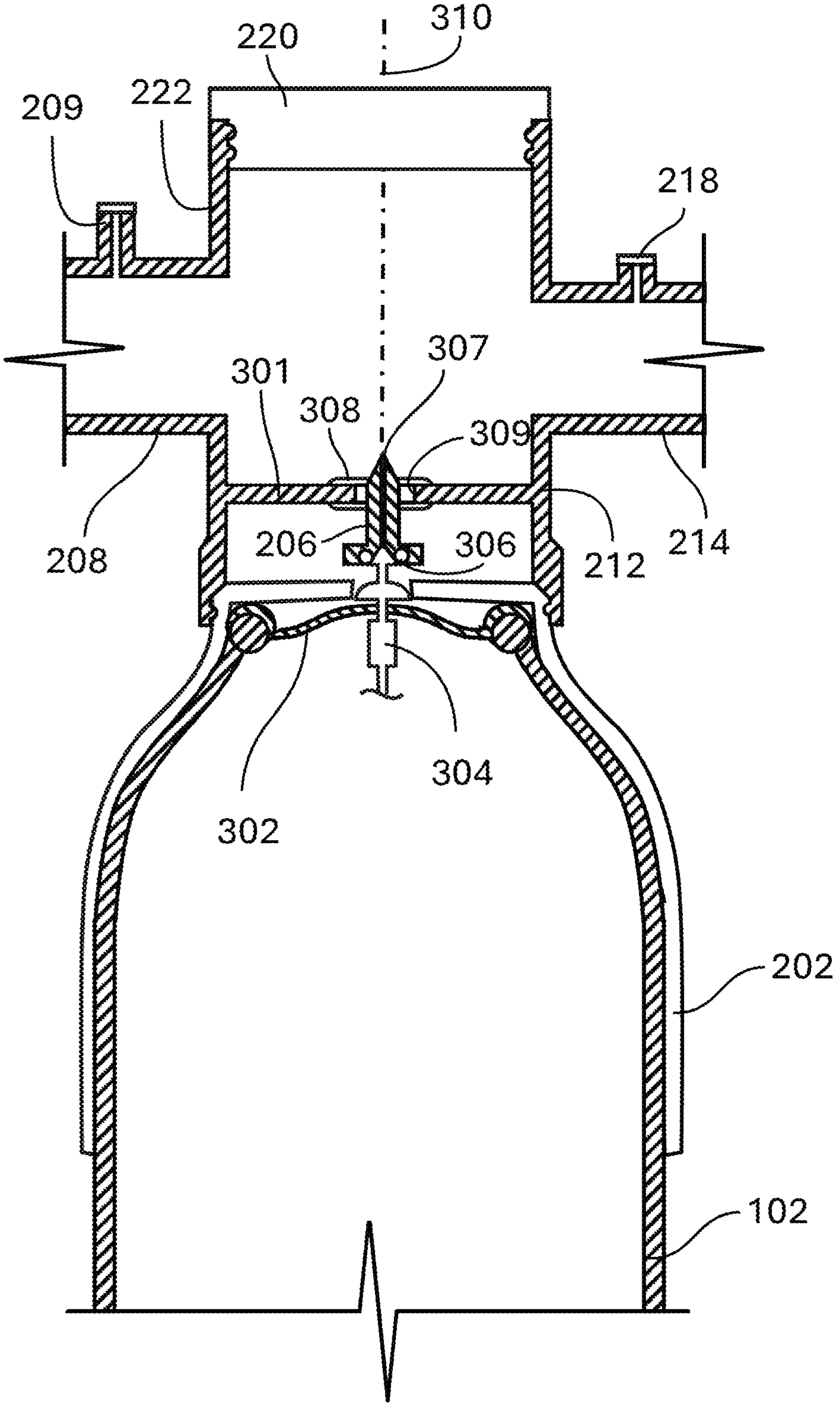
FIG. 3 shows a section view of a gas delivery device revealing internal components, according to aspects of the present disclosure.

Referring to FIGS. 2 and 3, various implementations of a gas delivery device can be seen. FIG. 2 illustrates an orthogonal view of the gas delivery device 100, revealing additional components. The gas delivery device 100 may include a coupling portion 202 configured to be directly coupled to the portable gas container 102, and a manifold 204 operably coupled to the coupling portion 202. FIG. 3 illustrates a section view of the gas delivery device 100, revealing the internal structure of the coupling portion 202 and a manifold 204, and the interaction with the portable gas container 102.

Coupling Portion

The coupling portion 202 may be configured to directly couple with the portable gas container 102. As shown in FIG. 2, the coupling portion 202 may be positioned between the portable gas container 102 and the manifold 204. In some cases, the coupling portion 202 may include a top portion and a bottom portion. The top portion may define a top opening having a first diameter, while the bottom portion may define a bottom opening having a second diameter. The second diameter of the bottom opening may be larger than the first diameter of the top opening. This configuration may allow for secure attachment to the portable gas container 102 while providing a suitable interface with the manifold 204.

Figure 6:
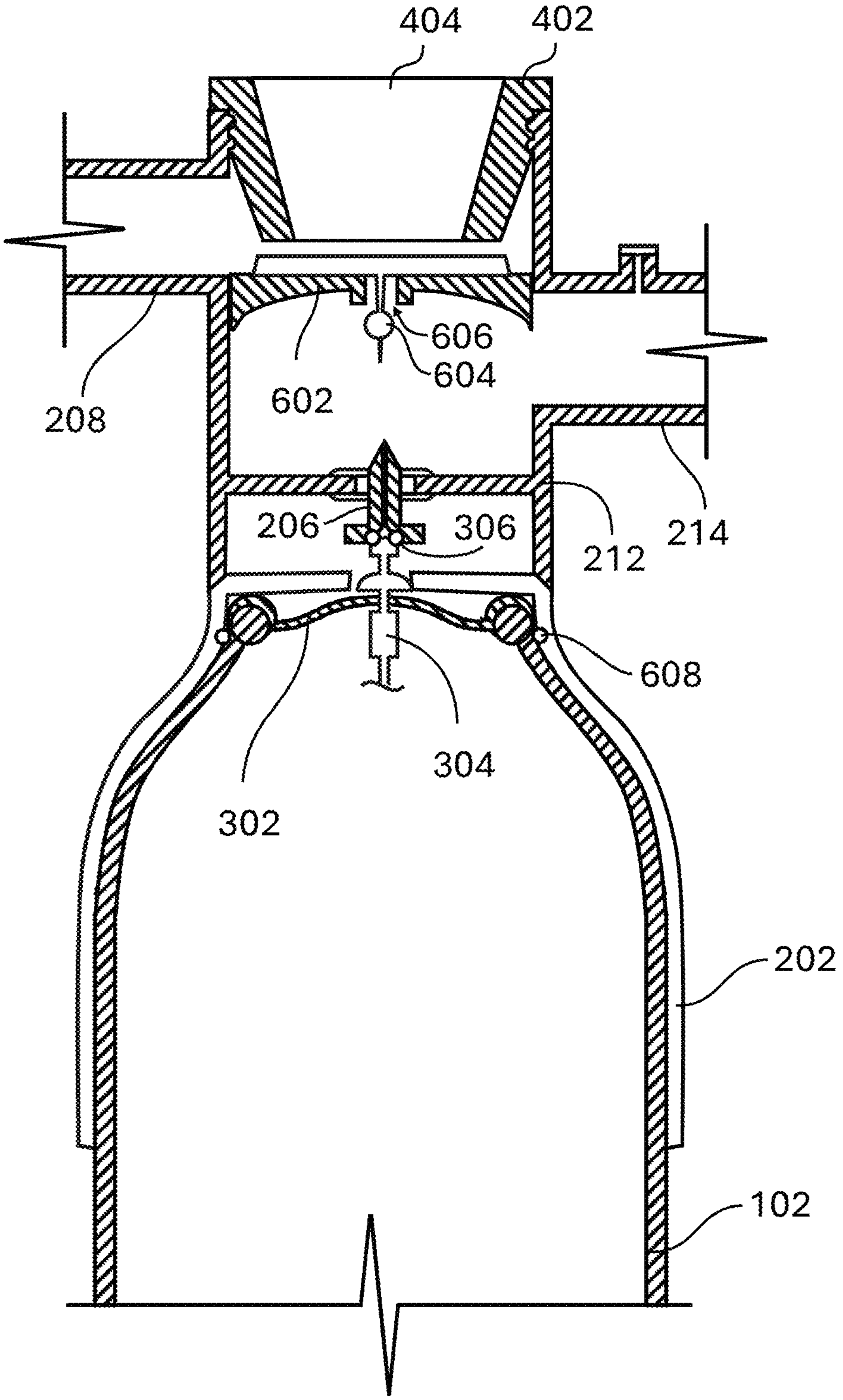
FIG. 6 shows a section view of a gas delivery device with internal components, according to an embodiment.
Figure 8:
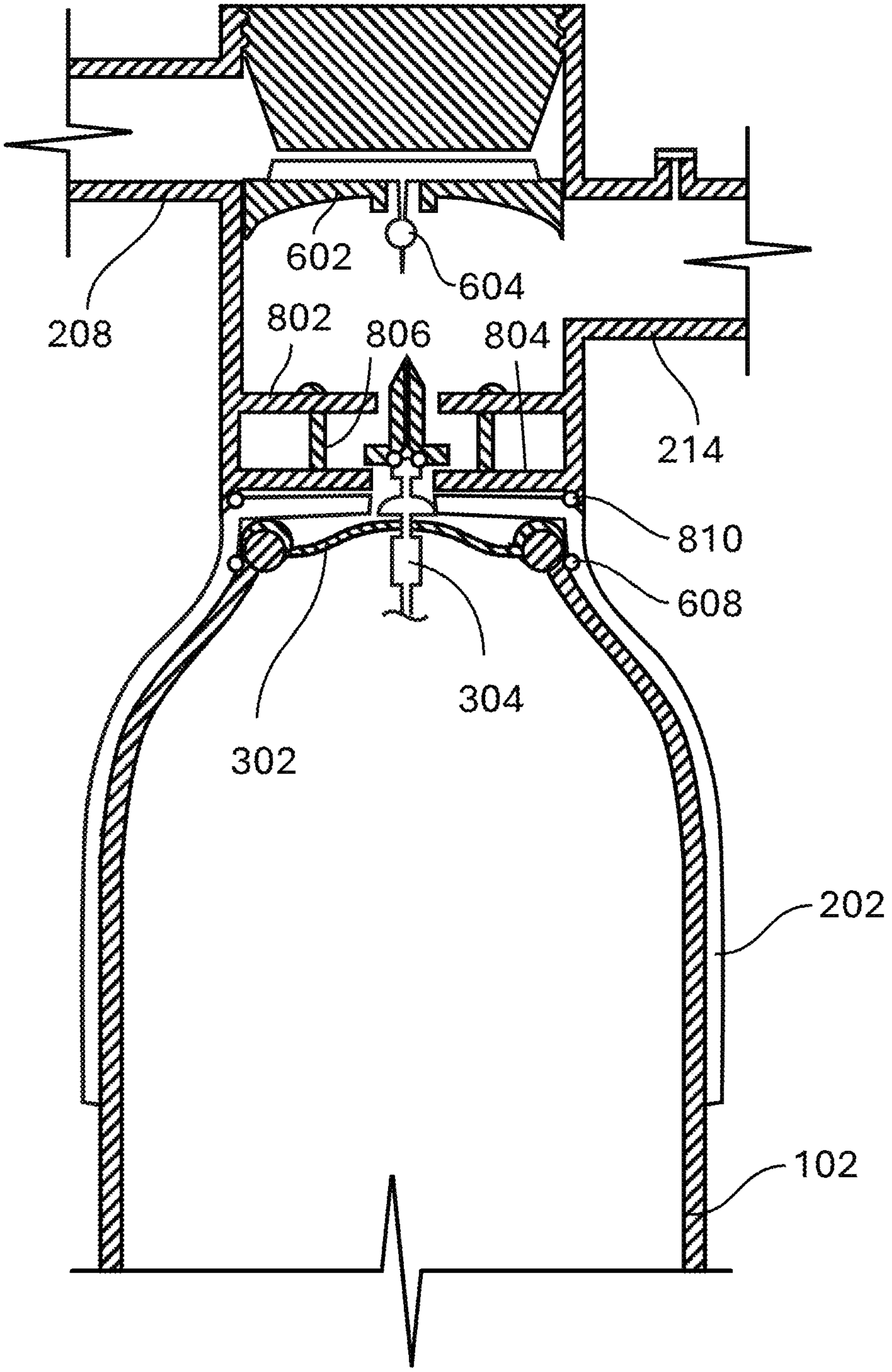
FIG. 8 depicts a section view of a portion of a gas delivery device, according to an embodiment.

The coupling portion 202 may be designed to allow for detachment of the portable gas container 102 from the primary inlet port 212 of the gas delivery device 100. This feature may enable the attachment of additional replacement portable gas containers (e.g., a second, third, or fourth additional container, depending on how long oxygen is needed, etc.) to the primary inlet port 212 when needed. FIG. 6 and FIG. 8 provide additional views of the coupling portion 202 and its interaction with the portable gas container 102, illustrating how these components may fit together within the overall structure of the gas delivery device 100. In FIGS. 6 and 8, it can be seen that an O-ring 608 may be provided between the coupling portion and the portable gas container, to reduce leakage.

The bottom opening of the coupling portion 202 may include an engagement mechanism 203 configured to engage the portable gas container 102. This engagement mechanism may prevent the coupling portion 202 from rotating relative to the portable gas container 102. In some cases, the engagement mechanism may include one or more teeth, one or more crimped portions, or one or more roughened surfaces. Alternatively, the second diameter of the bottom opening may be smaller than a maximum diameter of the portable gas container 102, creating a friction fit.

In some implementations, the coupling portion may be permanently affixed to the portable gas container. In some implementations, the coupling portion may be removably coupled to the portable gas container.

The dimensions of the coupling portion may vary based on the configuration of the gas container it is intended to be coupled to. However, in some implementations, the coupling portion may have a height (axial length, in the direction of the central axis of the gas container) that is 20 mm-65 mm, such as 30 mm-55 mm, and preferably 40 mm-45 mm. In some implementations, the coupling portion may have an outer diameter that is 50 mm-100 mm, such as 60 mm-90 mm, and preferably 70 mm-80 mm.

Manifold

A manifold 204 may be a central component of the gas delivery device 100, serving as a hub for various ports and connections. A manifold 204 may be configured to be directly coupled to the coupling portion 202. In some implementations, the manifold may be permanently coupled to the coupling portion (e.g., the coupling portion and the manifold may form a single integral component). In some implementations, the manifold may be removably coupled to the coupling portion. For example, there may be threads, tabs, or recesses at the bottom end 205 of the manifold, intended to interface with complementary threads, recesses, or tabs at the top end of the coupling portion 202. In preferred implementations, the manifold is coupled to the coupling portion via threads such that a quarter-turn or half-turn of the manifold, relative to the coupling portion, disconnects the manifold from the coupling portion. Having a removably coupled manifold may allow for easy replacement or maintenance of components. In a preferred embodiment threads are present on an interior surface of the manifold to interface with reciprocal threads on an exterior surface of the coupling component. Referring briefly to FIG. 8, an O-ring 810 may be positioned between the manifold 204 and the coupling portion 202 to ensure a proper seal.

The manifold 204 may include several key components. The manifold may include multiple ports to allow gases to flow in and out of the manifold in various ways.

A primary inlet port 212 (e.g., positioned at the bottom of the manifold, generally coaxial with a central axis 310 of the manifold) may be configured to allow gas from the portable gas container 102 to flow into the manifold 204. A primary outlet port 208 (e.g., extending radially outward from the central axis 310 of the manifold in a first direction) may be configured to direct gas from the portable gas container 102 towards a user (e.g., through a channel 210 directed towards a mouthpiece, mask, etc.). The primary inlet port 212 may be in fluid communication with the primary outlet port 208.

In some cases, the manifold 204 may include a secondary inlet port 214 (e.g., extending radially outward from the central axis 310 of the manifold in a second direction, preferably opposite the first direction). The secondary inlet port 214 may be configured to allow a secondary gas source to be coupled to the manifold 204. The secondary inlet port 214 may be in fluid communication with the primary outlet port 208. A removable cap 216 and/or one-way valve 217 may be coupled to the secondary inlet port.

Figure 22:
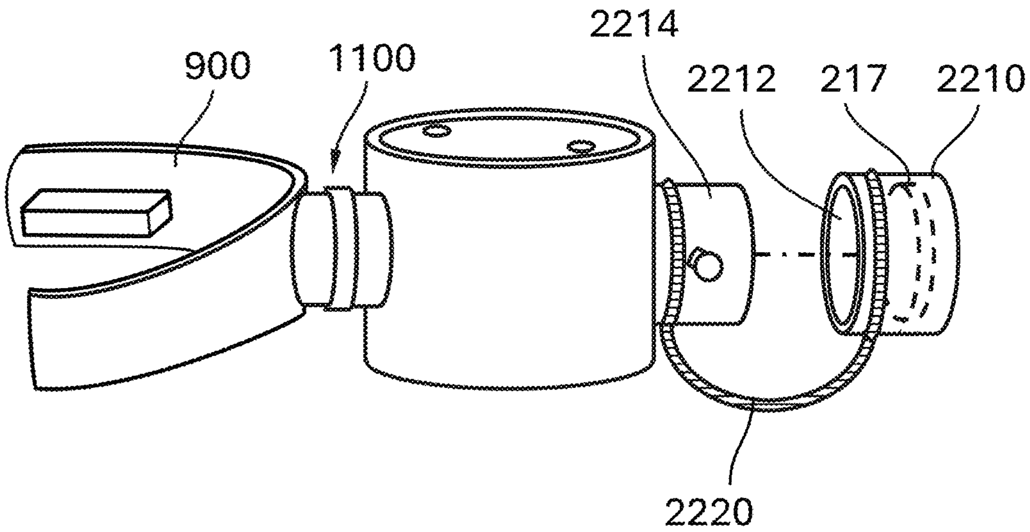
FIG. 22 shows an illustration of a manifold, mouthpiece, and one-way valve in a housing.

In a preferred embodiment, the secondary inlet port 214 may be configured to be coupled to a one-way valve 217 that is removable. The removable one-way valve may be configured to allow air to enter through the secondary inlet port, but prevent air from passing back out. Referring to FIG. 22, in some implementations, the one-way valve 217 may be positioned within a one-way valve housing 2210. An inner surface 2212 may be configured to contact an outer surface 2214 of the secondary inlet port (e.g., the one-way valve housing one-way valve may be slidably attached to the secondary inlet port, and may be held in place via friction forces). In some implementations, the secondary inlet port may be free of any threads, protrusions, or depressions that can be used to couple a component to the secondary inlet port. In some implementations, only the outer surface 2214 of the secondary inlet port may be free of any such threads, protrusions, or depressions.

Figure 23:
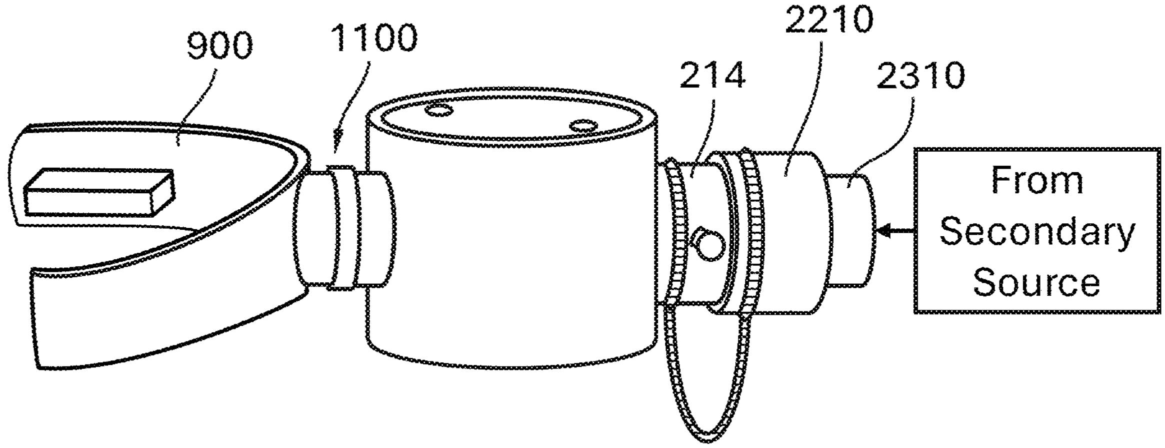
FIG. 23 shows an illustration of the manifold of FIG. 22 coupled to a secondary gas source.

The one-way valve may be removed (e.g., by a user) from the secondary inlet port to allow gas from a secondary source to connect directly to the manifold. For example, a secondary source may already include a one-way valve, and having a second such valve may be undesirable. However, as seen in FIG. 23, in some implementations, a secondary source be connected (e.g., via a coupler 2310) to the one-way valve housing 2210 containing the one-way valve. In some implementations, an outer surface of the coupler 2310 may be in contact with an inner surface of the one-way valve housing 2210.

A removable one-way valve may have a tether 2220 coupling the tether to the manifold. As shown, the tether may be coupled to the outer surface 2214 of the secondary inlet port. The tether may be of any flexible material, but is preferably a hypoallergenic material, such as a medical grade silicone.

The secondary source may be any appropriate secondary source. In a preferred implementation, the secondary source may be a manual resuscitator, such as a bag-valve-mask (BVM) system. In some implementations, the secondary source may be a rescue vehicle related system, e.g., an ambulance gas delivery system, etc. In some implementations, the secondary source may be a hospital-based supply, which may include an oxygen concentrator, an oxygen cylinders, or a central oxygen supply system.

As seen in FIG. 3, the manifold may include a sensing or detector port 209, which may be operably coupled to the primary outlet port 208. A removable cap may be coupled to the sensing or detector port 209.

Referring again to FIG. 2, the manifold may include an oxygen port 218, which may be operably coupled to the secondary inlet port 214. Like the secondary inlet port, a removable cap and/or one-way valve may be coupled to the oxygen port.

The manifold 204 may also include an additional port 222. The additional port 222 may be in fluid communication with at least the primary inlet port 212. A cap 220 may be coupled or removably coupled to the end of the additional port 222.

The cap 220 may be free of openings extending from a top surface to a bottom surface. In some implementations, the cap may have one or more openings (such as one or two openings) extending from a top surface to the bottom surface. The cap may have an axial height of 4 mm-20 mm, such as 6 mm-16 mm, such as 8 mm-12 mm. The cap may have an outer diameter of 20 mm-60 mm, such as 30 mm-55 mm, such as 40 mm-50 mm.

The manifold may have a height (e.g., from the top to the bottom) of 30 mm-60 mm, such as 35 mm-55 mm, such as 40 mm-50 mm. The manifold may have a length (e.g., from the primary outlet port to the secondary inlet port) of 60 mm-100 mm, such as 65 mm-95 mm, such as 70 mm-90 mm. The manifold may have a width (e.g., from front to back) of 30 mm-70 mm, such as 40 mm-65 mm, such as 45 mm-60 mm.

Figure 4:
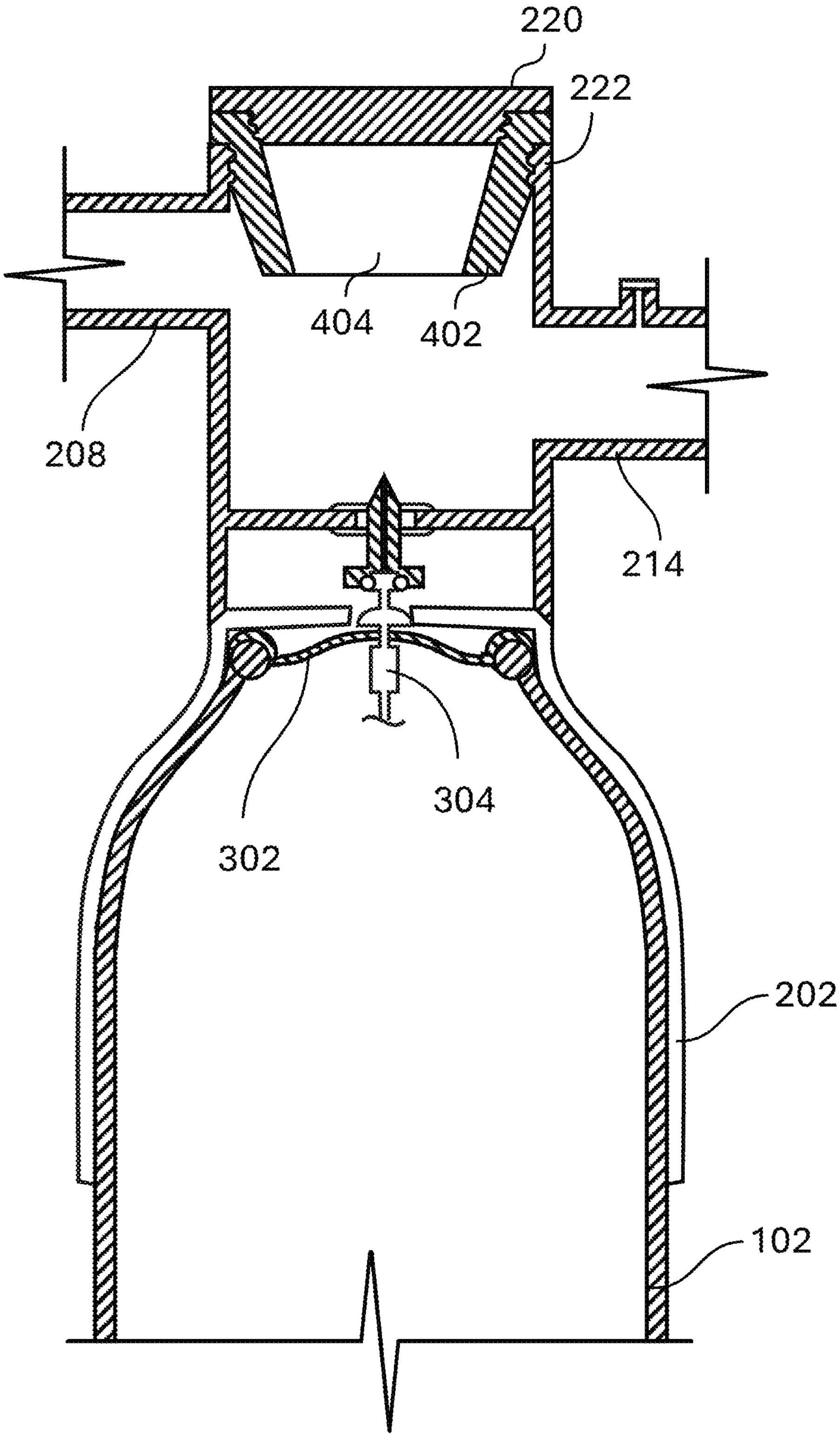
FIG. 4 illustrates another section view of a gas delivery device, according to an embodiment.

In FIG. 3, an opening for the primary outlet port and an opening for the secondary inlet port are substantially aligned in an axial direction (e.g., a line can be drawn, orthogonal to a central axis 310 of the manifold, that passes through both openings). In FIG. 4, a slightly modified version is shown, when the openings for the primary outlet port and the secondary inlet port are offset in an axial direction.

In some embodiments, an exhalation cap 402 may be provided, as an alternative to, or in addition to, the cap 220, and may be at least partially within the additional port 222. The exhalation cap 402 may also be permanently or removably coupled to the manifold. The exhalation cap 402 may include an opening 404 extending through the exhalation cap, to allow air to flow out through the additional port when the cap 220 is not in place.

Selectable Gas Release Component

A selectable gas release component 206 may extend through a sidewall of the manifold 204, and may releases the breathable gas from the portable gas container when engaged by the user. As will be understood, the selectable gas release component may include, e.g., a button, dial, knob, lever, or trigger that engages a release valve or other release component(s). The selectable gas release component 206 may be configured to controllably engage a valve of the portable gas container 102, allowing for controlled release of gas from the portable gas container 102 into the manifold 204. In some implementations, the selectable gas release component may include a channel 307 extending through a portion of the selectable gas release component, such that the breathable gas exiting from the valve stem 304 may pass into the manifold through the channel 307. An O-ring 306 may be present between the channel and the valve stem to prevent leakage of the gas back towards the portable gas container 102 and out through, e.g., gaps at the bottom of the coupling portion 202 between the coupling portion and the portable gas container 102.

Figure 12:
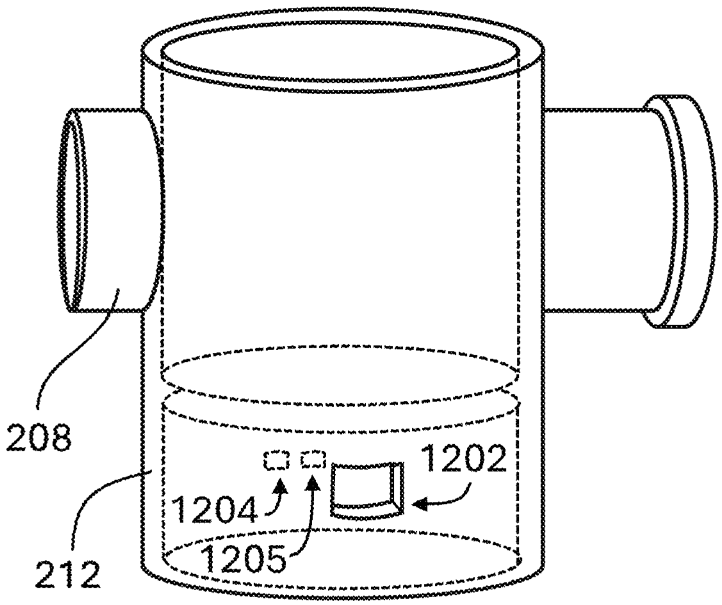
FIGS. 12 and 13 show gas delivery devices with openings for a selectable gas release component, according to various embodiments.
Figure 13:
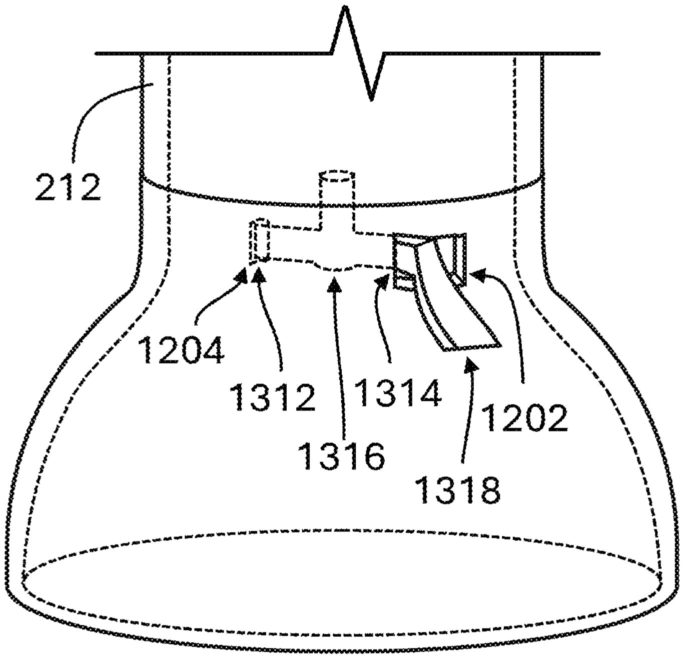
Figure 18:
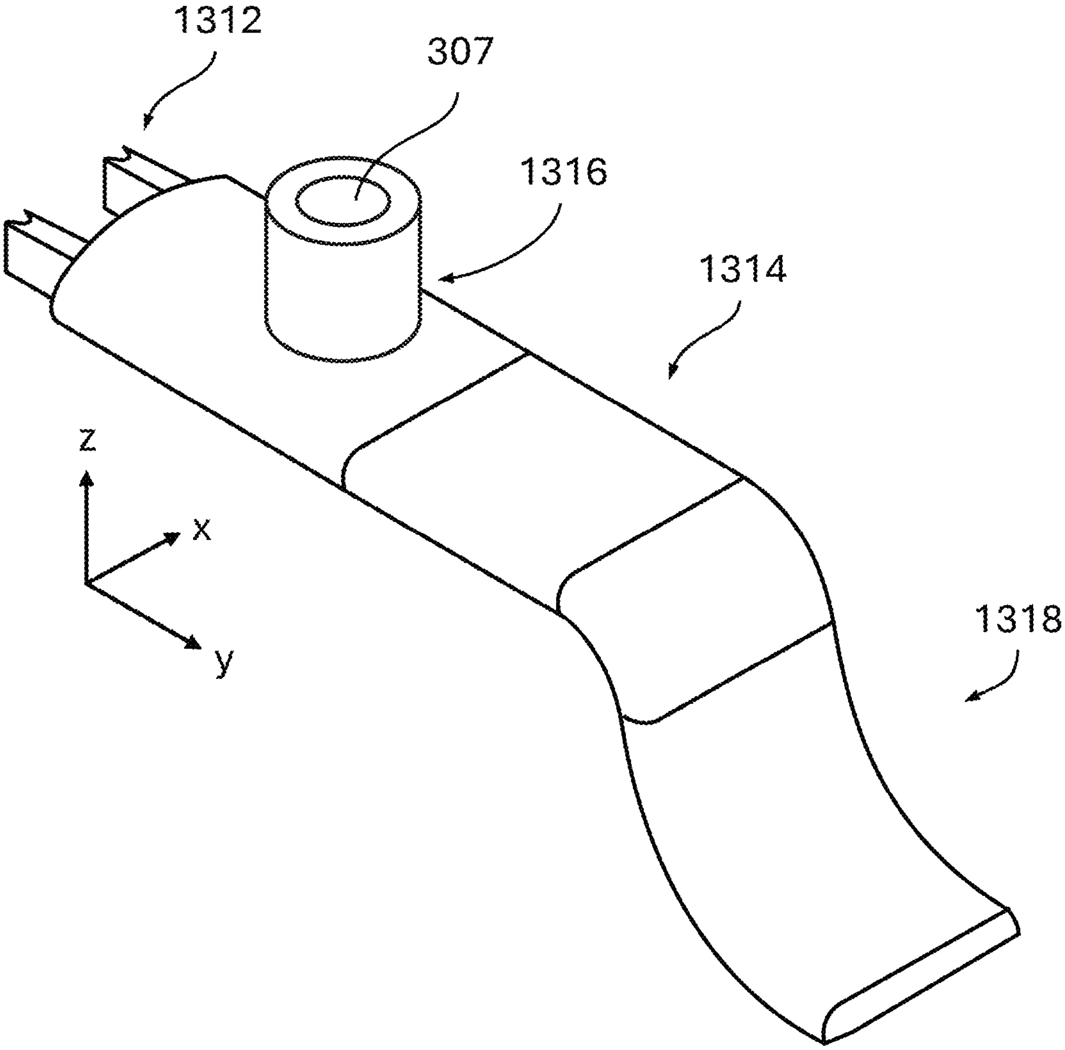
FIG. 18 shows a view of a trigger.

Referring brief to FIGS. 12 and 13, the selectable gas release component may extend through the sidewalls forming the manifold 204 (FIG. 12) or coupling portion 202 (FIG. 13) to interact with the valve stem 304, enabling controlled release of gas from the portable gas container 102 into the manifold 204. To allow this, the manifold and/or the coupling portion may include openings to allow the selectable gas release component to pass through the sidewalls. In FIG. 12, the manifold is shown as including a first opening 1204 (an additional opening 1205 is also shown) in a sidewall of the manifold at or near the primary inlet port for receiving an end of the selectable gas release component, and a second opening 1202 in the sidewall opposite the first opening, the second opening configured to allow an intermediate portion of the selectable gas release component to pass through the sidewall. In FIG. 13, a similar arrangement is seen, but with only a single first opening. In this fashion, the selectable gas release component can form a lever, with one end 1312 disposed with the openings (including first opening 1204 and additional opening 1205), a trigger stem 1316 operably coupled to the valve stem, an intermediate portion 1314 extending through the second opening 1202, and a second end 1318 forming a trigger. When the trigger is pulled, the valve stem is depressed, allowing gas to be released. An example of a selectable gas release component can be seen in FIG. 18.

The selectable gas release component may have a length (e.g., in the y-direction shown in FIG. 18) of 40 mm to 90 mm, such as between 50 mm and 80 mm, and preferably between 65 mm and 75 mm. The selectable gas release component may have a width (e.g., in the x-direction shown in FIG. 18) of 5 mm to 25 mm, such as between 10 mm and 20 mm, and preferably between 12 mm and 18 mm. The selectable gas release component may have a height (e.g., in the z-direction shown in FIG. 18) of 20 mm to 50 mm, such as between 25 mm and 45 mm, and preferably between 30 mm and 40 mm.

Grommet Seal

The primary inlet port 212 may include an intermediate partition 301, oriented orthogonally to a central axis 310 of the manifold, with an opening 309 extending from a top surface to a bottom surface. The opening may be the only passageway through which a gas is intended to flow from the portable gas container towards a patient or user.

A grommet seal 308 may be disposed within the opening. The selectable gas release component 206 may extend through a central opening of a grommet seal 308 positioned within the primary inlet port 212. This arrangement may allow for controlled movement of the selectable gas release component 206 while maintaining a proper seal.

The grommet seal may have an outer diameter of between 20 and 40 mm, such as between 25 and 35 mm, and preferably between 27 and 30 mm. The grommet seal may have a thickness/height of between 5 and 10 mm, such as between 6 and 9 mm, and preferably between 7 and 8 mm.

The grommet seal 308 may play a crucial role in preventing gas from the portable gas container 102 from escaping through the primary inlet port 212. In some cases, the grommet seal 308 may remain in contact with a trigger stem of the selectable gas release component 206 throughout activation, ensuring a continuous seal during operation.

Figure 5A:
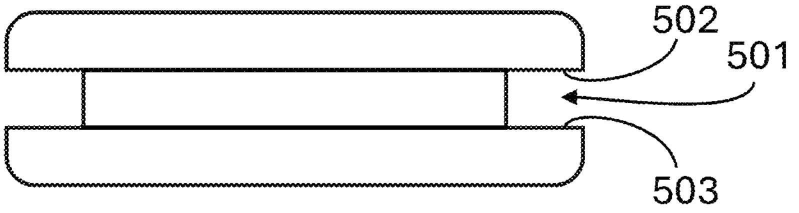
FIGS. 5A-5C depict various views of a sealing mechanism for a gas delivery device, according to aspects of the present disclosure.
Figure 5B:
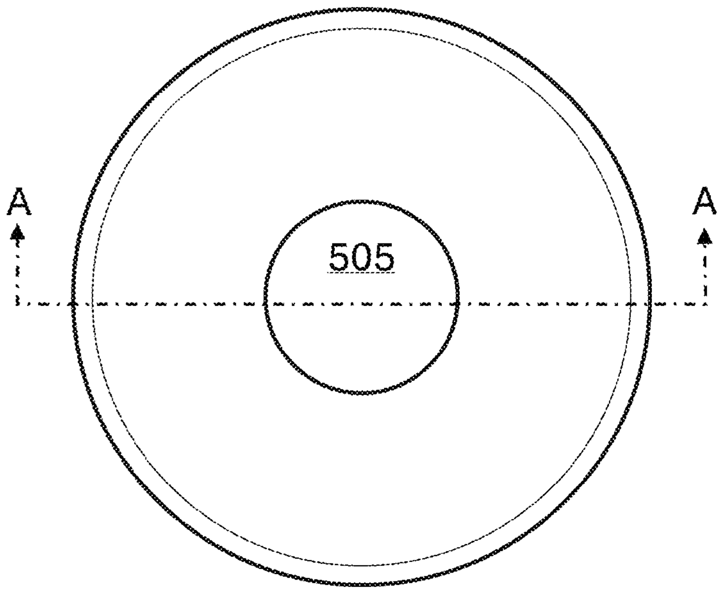
Figure 5C:
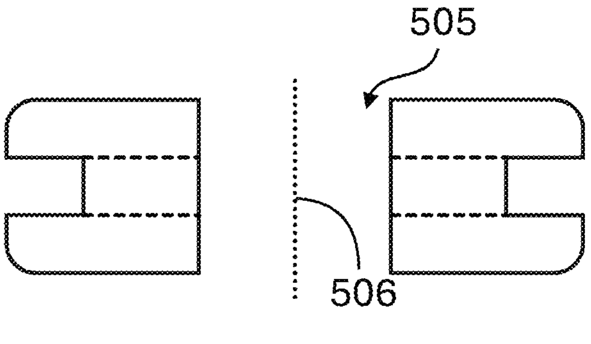

FIGS. 5A-5C illustrate detailed views of the grommet seal 308. As shown in FIG. 5A, the grommet seal 308 may include an external channel 501 configured to fit around edges of an intermediate partition 301 within the primary inlet port 212. In particular, a top surface 502 of the channel may be configured to contact a top surface of the intermediate partition, while a bottom surface 503 of the channel may be configured to contact a bottom surface of the intermediate partition. A central opening 505 of the grommet allows gas to flow and further enter the manifold, while maintaining a proper seal. The central opening may be between 2 and 10 mm in diameter, such as between 4 and 8 mm in diameter, and preferably between 5 and 7 mm in diameter.

The valve stem 304 may extend from the portable gas container 102 into the coupling portion 202. In some cases, the valve stem 304 may be coaxial with the central axis 506 of the gasket seal ring within the primary inlet port 212.

This configuration of components in the gas delivery device 100 may allow for efficient and controlled delivery of breathable gas to a user through various possible interfaces, such as the mouthpiece or mask 104.

Disc or Umbrella Valve

FIG. 6 provides another side view of an implementation of a gas delivery device 100. In this implementation, a disc or umbrella valve 604 is provided. A secondary intermediate platform 602 may be provided, with an opening 606 extending from a bottom surface to a top surface of the secondary intermediate platform. The secondary intermediate platform 602 may be placed to separate the inlets (e.g., primary inlet port 212 and the secondary inlet port 214) from the other ports (primary outlet port 208 and additional port 222). Working in conjunction with the exhalation cap 402, the disc or umbrella valve 604 can ensure a desirable airflow.

Figure 7A:
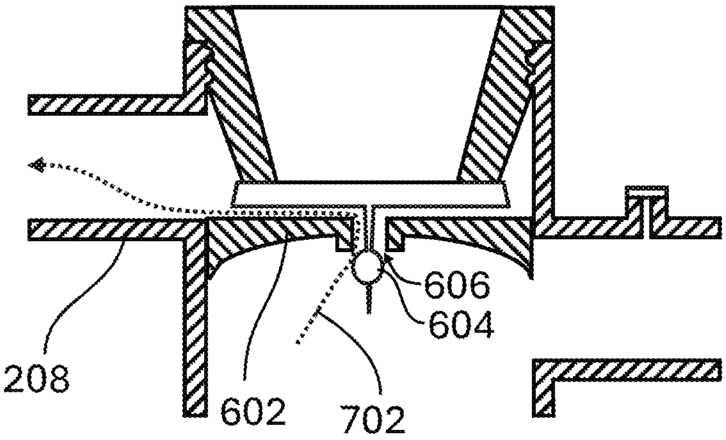
FIGS. 7A-7B illustrate section views showing gas flow paths through a gas delivery device, according to aspects of the present disclosure.
Figure 7B:
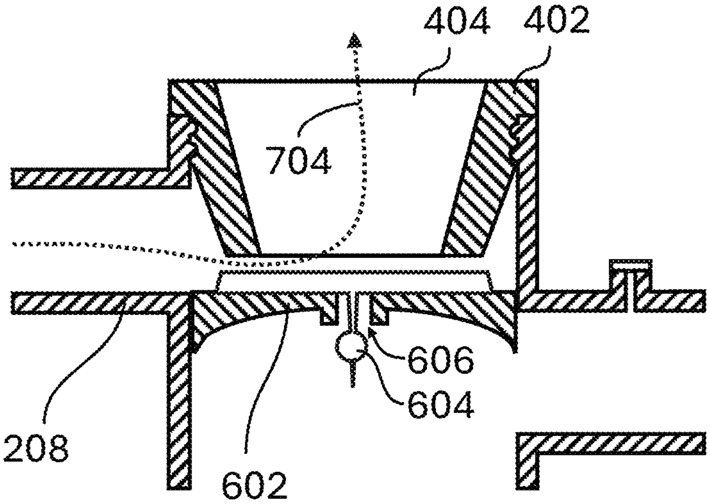

Referring to FIG. 7A, it can be seen that a gas flow 702 from the portable gas container causes the disc or umbrella valve to raise, allowing the gas to flow through the opening 606 in the secondary intermediate platform 602, past the disc or umbrella valve, and towards the primary outlet port 208. Referring to FIG. 7B, it can be seen that when gas is not flowing from the portable gas container, but instead the gas flow 704 is from the user or patient (e.g., an exhalation), the disc or umbrella valve seals the opening 606 and in doing so creates a gap to allow the gas to flow from the user, back through the primary outlet port, and then out through the opening 404 in the exhalation cap 402.

FIG. 8 provides another side view of an implementation of a gas delivery device 100. In this implementation, a disc or umbrella valve 604 is provided, but no grommet seal is utilized. In some cases, the device may include a first internal wall 802 and a second internal wall 804. These internal walls may create separate flow paths within the manifold 204. A support or connector 806 may extend between portions of the internal structure. The support or connector 806 may provide structural integrity to the internal components or serve as a mounting point for other elements.

Mouthpiece or Mask

These internal flow control components may work together to ensure efficient and controlled gas delivery to the user through the mouthpiece or mask 104. The arrangement of internal walls, valves, and openings may allow for proper gas flow during both inhalation and exhalation, enhancing the overall functionality of the gas delivery device 100.

The gas delivery device 100 may include a mouthpiece or mask 104 as a patient interaction component. The mouthpiece or mask 104 may be operably coupled to the primary outlet port 208, allowing for delivery of gas from the portable gas container 102 to a user.

Figure 9A:
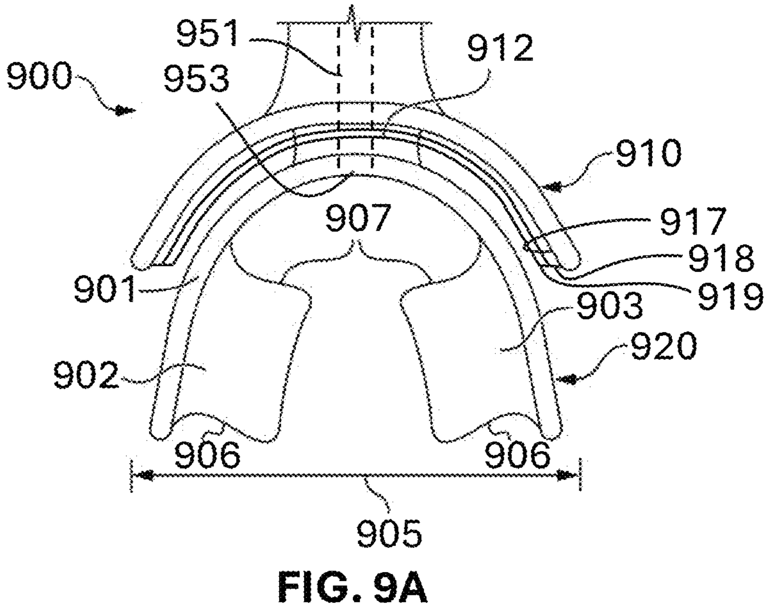
FIGS. 9A-9B show orthogonal views of a mouthpiece component for a gas delivery device, according to aspects of the present disclosure.
Figure 9B:
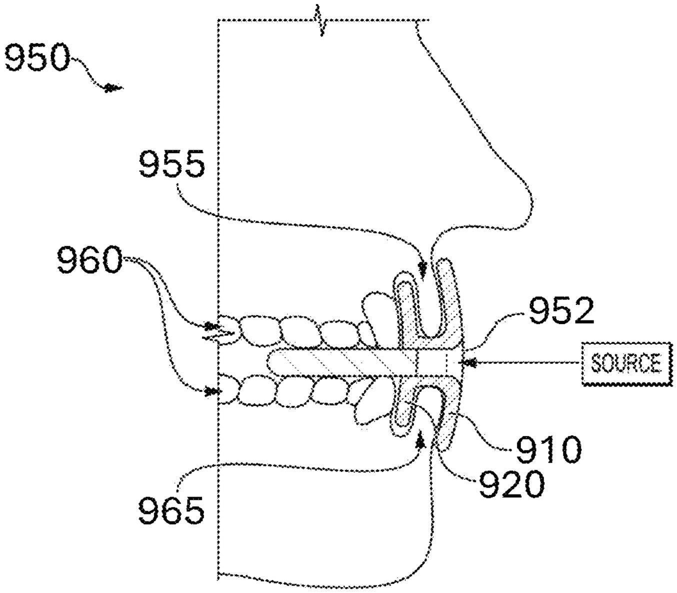

In some cases, the patient interaction component may be a mouthpiece. FIGS. 9A and 9B illustrate orthogonal views of a mouthpiece component 900. These figures demonstrate an embodiment of a mouthpiece component 900 having a lateral width 905, and comprising a lip seal/lip engagement component 920, an oral/mouth shield 910, and a mouthguard component 901.

The mouthpiece component 900 may include a mouthguard component 901 with a left teeth engagement 902 and a right teeth engagement 903. The left teeth engagement 902 and the right teeth engagement 903 may be separated from each other such that no portion of the left teeth engagement 902 is in contact with any portion of the right teeth engagement 903. No particular surface contouring of the teeth engagements is shown. The bitewings are shown as having posterior side contouring 906 and anterior side contouring 907, e.g., curvature(s), e.g., each illustrated as being in a generally "S" shape. In aspects, such contouring aids in the comfort of the device, stability of the device when in place and ready for use, or both.

The mouthpiece component 900 may define a mouthpiece airway 951 for a gas, having a gas inlet 952 configured to receive a first gas flow from the portable gas container 102. A gas outlet 953 may be included through which gas can flow out of the mouthpiece component 900 and into a mouth of a person when the mouthpiece component 900 is placed into the mouth of the person.

An oral/mouth shield 910 may be connected to the mouthguard component 901. The oral/mouth shield 910 may help create a seal around the user's mouth. A lip seal/lip engagement component 920 may be positioned to engage with the user's lips, further enhancing the seal.

In some cases, an adhesive 918 may be disposed at or near a proximal end of the mouthpiece component 900 (e.g., on a surface 917 of the mouthpiece component intended to contact the area around a user's mouth, such as a surface facing away from the manifold). When the mouthpiece component 900 is inserted into a mouth of a patient, the adhesive may engage skin of the patient to maintain a seal around the mouth. A removable film 919 may be disposed over adhesive, such that the adhesive is between the removable film and the mouthpiece.

In FIG. 9B, a mouthpiece component 950 positioned within a device user's mouth, wherein the mouthpiece component 950 comprises a lip seal/lip engagement component 920 and an oral/mouth shield 910. The user's teeth 960 are positioned behind the lip seal/lip engagement component 920 and the user's top lip 955 and the user's bottom lip 965 are positioned between the lip seal/lip engagement component 920 and the oral/mouth shield 910. The mouthpiece may include a connector component (912) connecting the lip seal/lip engagement component to the oral/mouth shield connection. The gas inlet 952 can receive substance(s), such as, e.g., gas(es), API(s), or combination(s) thereof from a source (e.g., substance storage container, a source connected to a variable flow component, or both) upon their release from the source.

Figure 10:
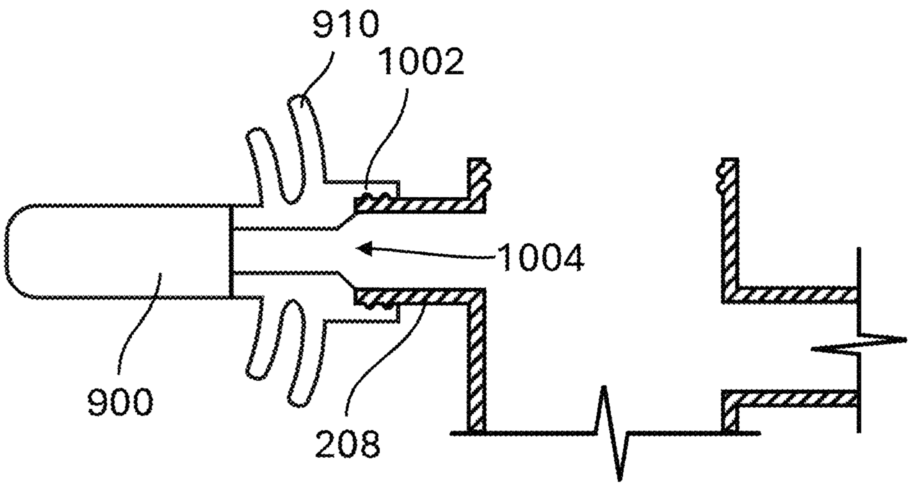
FIG. 10 illustrates a section view of a mouthpiece assembly for a gas delivery device, according to an embodiment.
Figure 11:
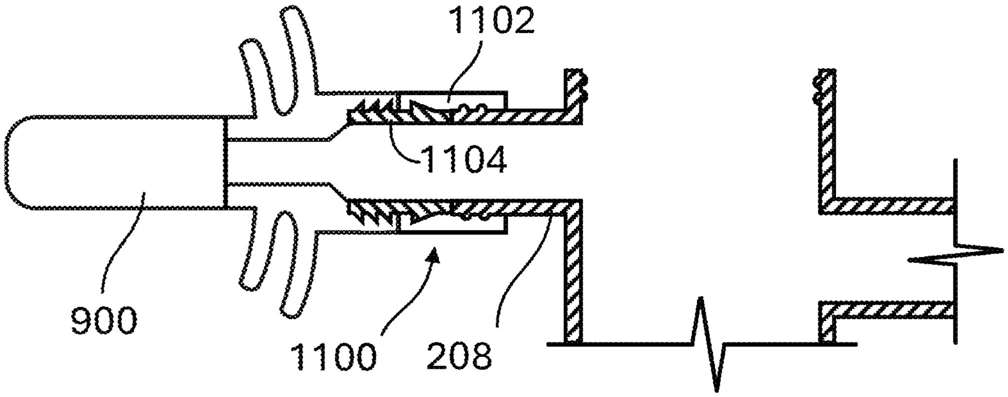
FIG. 11 depicts a section view of an alternative mouthpiece assembly for a gas delivery device, according to aspects of the present disclosure.

FIGS. 10-11 illustrate different coupling configurations for the mouthpiece component 900. In FIG. 10, the mouthpiece includes a mouthpiece coupling extension 1002, which extends proximally outward from the mouthpiece, directly coupling the mouthpiece component 900 to the primary outlet port 208. In some embodiments, the mouthpiece is removably coupled to the manifold. In some embodiments, the mouthpiece may not be removed once attached to the manifold. The coupling extensions include a channel 1004 allow gas to pass through the coupling extension towards the mouthpiece. In some implementations, the channel 1004 may be narrower than the channel (e.g., channel 210) of the primary outlet port 208 to which it is connected.

In FIG. 11, a rotatable component 1100 (e.g., a spinning sleeve, etc.) may indirectly couple the mouthpiece component 900 to the primary outlet port 208, allowing for adjustable positioning of the portable gas container relative to the mouthpiece. The rotatable component 1100 (sometimes referred to as a "swiveling component") acts as a pivot, allowing the mouthpiece or mask to remain in fixed in place while the rest of the gas delivery device rotates (e.g., in a plane orthogonal to a central axis of the mouthpiece airway 951). The rotatable component may include a first portion 1102 that is configured to be coupled to the primary outlet port 208, and a second portion 1104, coaxial with the first portion, that is configured to be coupled to the mouthpiece. Any appropriate means for connecting the first and second portions together to allow the components to rotate is envisioned. For example, slots or tabs on an external surface of the second portion may be configured to slide within channels on an internal surface of the first portion.

In some implementations, the rotatable component may have an outer diameter of 20 mm-40 mm, such as 25 mm-38 mm, such as 30 mm-35 mm. In some implementations, the rotatable component may have an axial length of 15 mm-35 mm, such as 20 mm-30 mm, such as 23 mm-28 mm.

In some cases, the patient interaction component may be a mask configured to be disposed over at least a portion of a patient's face. The mask may be directly coupled to the primary outlet port 208 or indirectly coupled via one or more tubes.

Alternatively, the patient interaction component may be a laryngeal mask airway (LMA) or oropharyngeal airway. These components may provide different options for delivering gas to a patient based on specific medical needs or situations.

Figure 20A:
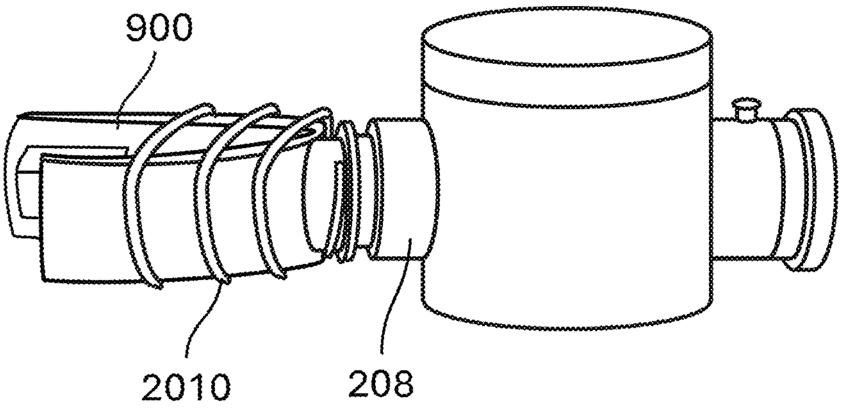
FIGS. 20A and 20B show views of a coil near a mouthpiece, with the mouthpiece in a compressed configuration (20A) and an expanded configuration (20B).
Figure 20B:
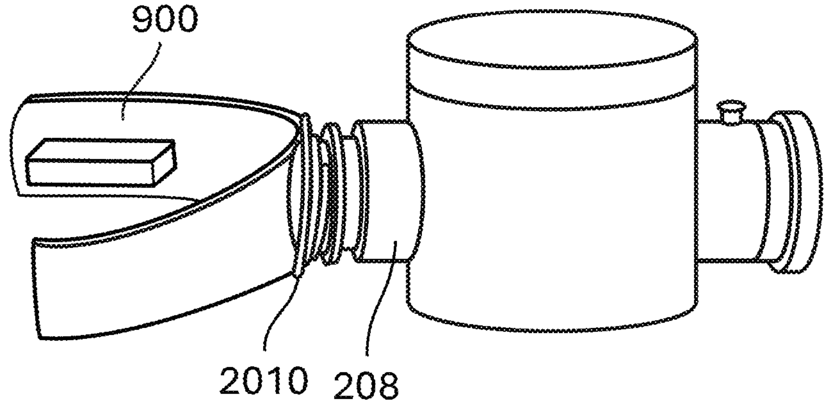

Referring to FIGS. 20A and 20B, in some embodiments, a spring-like feature 2010 may be utilized to keep the left and right "wings" of the mouthpiece component 900 closer together to enable easier insertion of the mouthpiece into a patient's mouth. The spring-like feature 2010 may be any appropriate plastic (such as an elastomeric material) or metal (such as a stainless steel) may be coupled to a proximal end of the mouthpiece (a portion that would be closer to the manifold) and in a first configuration (FIG. 20A) may extend distally over at least a portion of the mouthpiece to force the mouthpiece into a compressed configuration. In some implementations, the spring-like feature 2010 may extend at least partially around the left and/or right teeth engagement features. When the device is inserted into a person's mouth, the lips push back the spring-like feature 2010 (e.g., cause the compression of the spring-like feature or moving the most distal end of the spring-like feature proximally, to allow the mouthpiece to expand until it reaches an expanded configuration (FIG. 20B). The spring-like feature guides the mouth so the mouthpiece lines up in the person's mouth and the mouthpiece does not go too far into the patient's mouth.

Figure 21A:
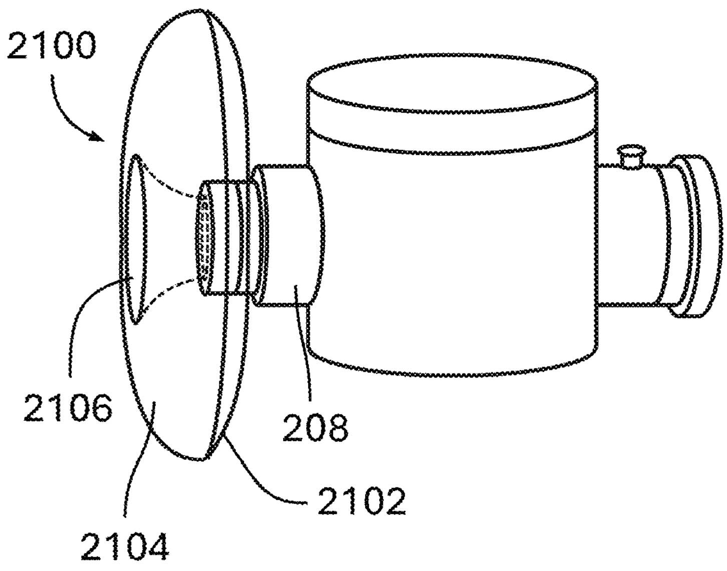
FIGS. 21A and 21B show views of embodiments of a mask.
Figure 21B:
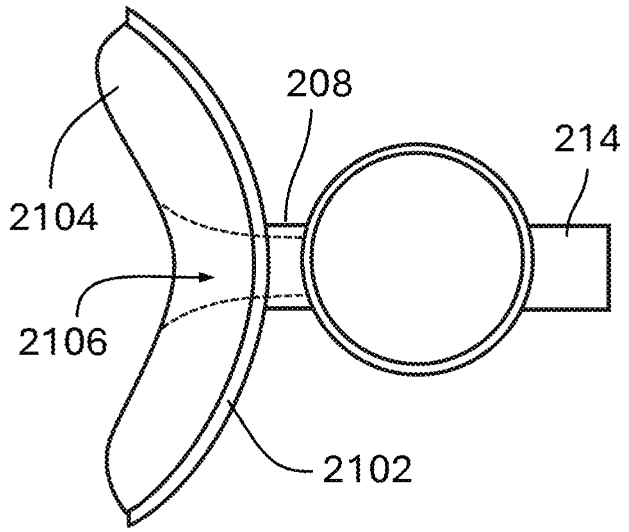

Referring to FIGS. 21A and 21B, in some implementations, a mask 2100 may be provided that may be, e.g., a flexible or inflatable mask. The mask may include a support backing 2102 that may be coupled to a flexible film 2104. The flexible film may be configured to be pressed against a patient's face, and prevent oxygen from escaping the patient's nose and/or mouth. The support backing may be a polymeric material. The flexible film may be a polymeric material. The flexible film may be configured to have a rigidity that is less than a rigidity of the support backing. Any appropriate polymer may be utilized, including, e.g., polypropylene, polyethylene, a polyurethane, etc. A rear surface of the support backing may be figured to be coupled to the primary outlet port 208. A front surface of the support backing may be coupled to the flexible film.

The mask is generally designed to be placed over the nose and/or mouth of a person. As such, the flexible film and support backing are generally configured to form an air pathway 2106 extending through the mask, to allow air from the primary outlet port 208 to pass through the support backing to the patient. In some instances, the flexible film 2104 may be configured in a substantially toroidal shape, with the central opening of the toroid forming the pathway from the support backing to the patient's nose and/or mouth.

In some implementations, the mask may be curved, to better fit a patient's face. As shown in FIG. 21B, when viewed from about, the support backing may have a curved shape that is configured to wrap partially around the user's face, which may result in a better seal with the patient's face. In some implementations, the mask may only curve around a single axis (here, the z-axis, going into the page in FIG. 21B. However, other implementations are envisioned, such as a mask with a hyperbolic paraboloid shape, a saddle shape, a dome shape, etc.

Other Components

Oxygen Port

Figure 19:
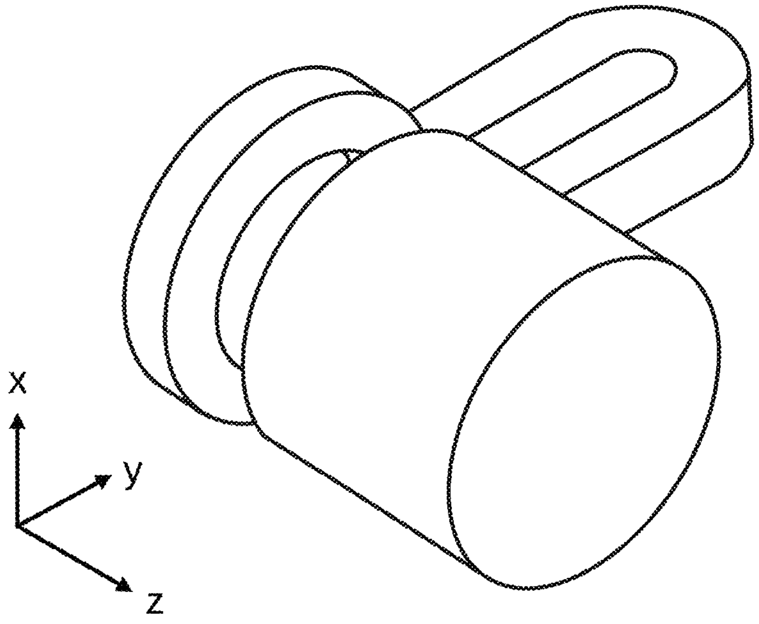
FIG. 19 shows a view of a cap.

Referring to FIGS. 2 and 3, in some cases, an oxygen port 218 may be operably coupled to the manifold 204 at or near the secondary inlet port 214. The oxygen port 218 may be configured to be operably coupled to an oxygen supply, providing an additional source of oxygen when needed. A cap may be placed over the oxygen port. An example of such a cap can be seen in FIG. 19. The cap may include a retaining portion or tether intended to be placed around the port and not be removed, and be coupled to the removable cap portion that is intended to be removed to allow access to the port. The width (the x-direction shown in FIG. 19) may be 5 mm-15 mm, such as 7 mm-13 mm, and preferably 8 mm-10 mm. The length (the y-direction shown in FIG. 19) may be 10 mm-30 mm, such as 15 mm-25 mm, and preferably 17 mm-22 mm. The height (the z-direction shown in FIG. 19) may be 5 mm-25 mm, such as 7 mm-20 mm, and preferably 10 mm-15 mm.

Pressure Monitoring or Control Components

The gas delivery device 100 may include various pressure monitoring and control components to ensure safe and effective gas delivery to a user. These components may be integrated into the manifold 204 or coupled to the primary outlet port 208.

Figure 14:
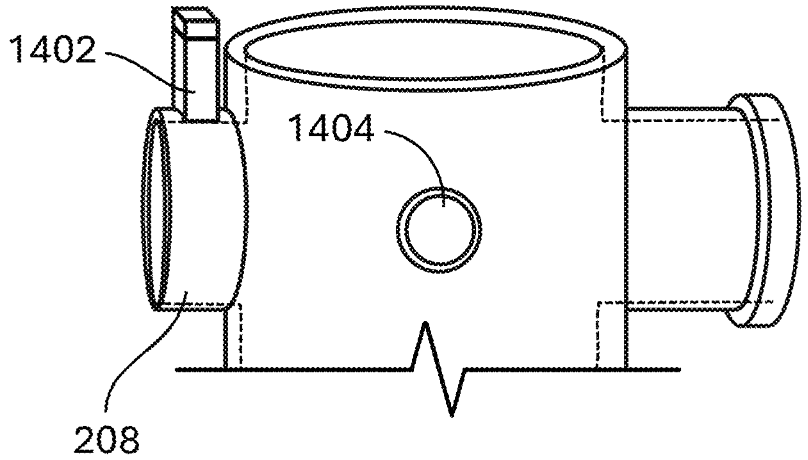
FIG. 14 illustrates another section view of a gas delivery device with pressure monitoring components, according to aspects of the present disclosure.

Referring to FIG. 14, in some cases, a pressure gauge 1402 may be operably coupled to the primary outlet port 208. FIG. 14 illustrates a section view of the gas delivery device 100 showing the pressure gauge 1402 extending upward from the device. The pressure gauge 1402 may allow for real-time monitoring of the gas pressure being delivered to the user through the mouthpiece or mask 104. In some cases, the pressure gauge 1402 may be a spring pressure gauge, utilizing a mechanical spring mechanism to measure and display pressure readings.

A pressure relief valve 1404 may also be operably coupled to the primary outlet port 208. As shown in FIG. 13, the pressure relief valve 1404 may be positioned on the side of the gas delivery device 100. The pressure relief valve 1404 may be configured to release excess pressure if the gas pressure within the manifold 204 exceeds a predetermined safe level. This safety feature may help prevent potential harm to the user from over-pressurization.

Figure 15:
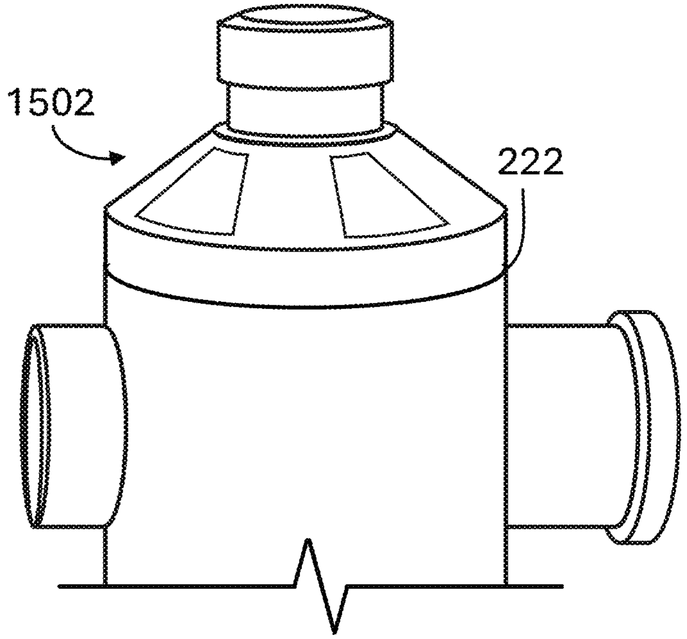
FIG. 15 depicts a section view of a gas delivery device with a PEEP valve, according to an embodiment.

In some cases, the gas delivery device 100 may include a Positive End Expiratory Pressure (PEEP) valve. Referring to FIG. 15, the PEEP valve may be incorporated as a first cap removably coupled to the additional port 222. FIG. 14 illustrates a section view showing the connection between a PEEP valve 1502 and the additional port 222. The PEEP valve 1502 may help maintain a small positive pressure in the user's lungs at the end of exhalation, which may improve oxygenation and prevent alveolar collapse in certain medical situations.

Duckbill Valve

In some cases, the gas delivery device 100 may include a duckbill valve disposed within the primary outlet port 208. In general, duckbill valves provide one-way flow, preventing back-contamination of oxygen supply. Duckbill valves support spontaneous breathing by opening on inhalation and closing on exhalation. The duckbill valves enable the patient to receive a rescue breath and exhale all while, e.g., the seal between the patients lips and mouthpiece (see, e.g., FIGS. 9A-9B) is maintained.

Figure 16:
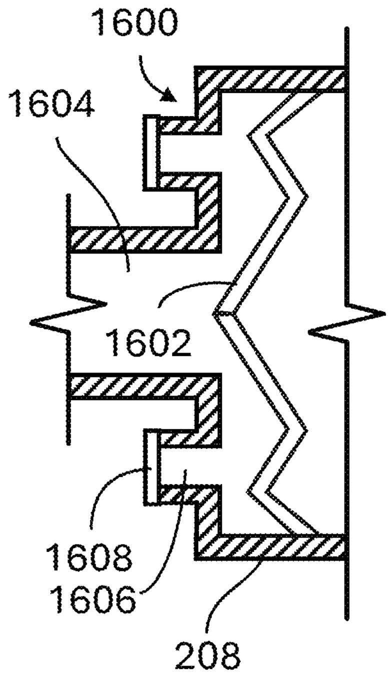
FIG. 16 shows a detailed section view of a duckbill valve for a gas delivery device, according to aspects of the present disclosure.

Referring to FIG. 16, a simplified duckbill valve 1600 can be seen. Air from a gas source passes into the primary outlet port 208, and through a flexible substrate seal 1602. The air flow causes the flexible substrate seal 1602 to open, directing air towards channel 1604 and on to the patient. In some implementations, if one or more side ports 1606 are not covered, ambient air may be drawn into the device, and be directed towards channel 1604.

When the air from a gas source (such as the portable gas cannister) stops flowing to the patient, the flexible substrate seal 1602 closes, preventing any air from the patient that passes through channel 1604 from progressing further into the primary outlet port 208. Rather, the exhaled gases may pass into one or more side ports 1606 and out of the device. In some implementations, a flexible seal 1608 may be disposed over the exhalation ports. The flexible seal may be configured to prevent outside air from entering the device, but allowing exhaled air to exit. In this way, the flexible seal

1608 can provide an indicator that the patient is exhaling-if the seal moves/a flap opens, that indicates some gas is being exhaled by the patient.

Respiration Detection

Figure 17:
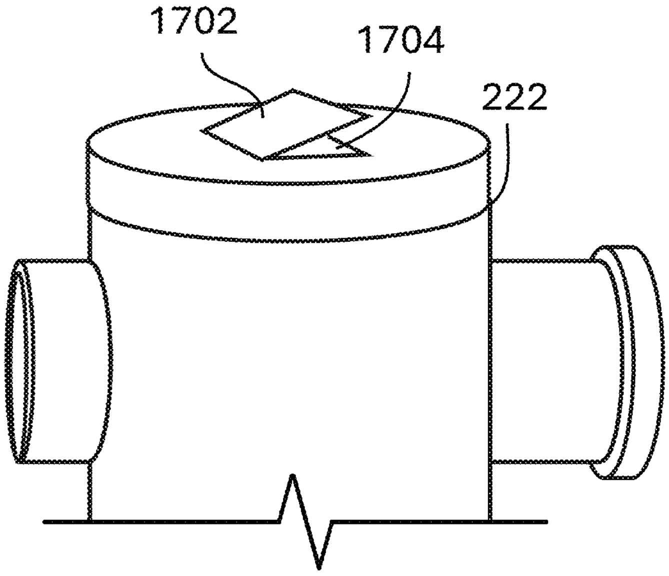
FIG. 17 shows a view of a vent for determining if a patient is breathing.

The gas delivery device 100 may also incorporate a ventilation and/or respiration detector configured to indicate when ventilation and/or respiration has taken place. In some cases, this detector may include a sensor configured to detect $CO_2$ in gas flowing from a patient. The $CO_2$ sensor may be positioned within the gas flow path, such as near the primary outlet port 208 or within the mouthpiece or mask 104. Detection of $CO_2$ in the exhaled gas may provide confirmation that effective ventilation or respiration is occurring. Alternatively, as shown in FIG. 17, a more mechanical means can be utilized. For example, a flexible substrate 1702, such as a paper or similar, may be disposed over an opening 1704, and when a patient exhales, it passes through the opening 1704, causing the flexible substrate 1702 to move.

In some implementations, a colorimetric $CO_2$ detector may be used, which may, e.g., change color if $CO_2$ is detected in exhaled breath. In some implementations, the colorimetric $CO_2$ detector may be coupled to a sensing or detector port 209. For example, an EASYCAP® or PEDI-CAP® $CO_2$ detector may be coupled to the sensing or detector port 209, and exhaled $CO_2$ will change the color from purple to yellow.

The entire device, when combined with the gas container, may be sized to be portable and easily maneuverable by a user. In some embodiments, the entire device coupled to a gas container, may have an axial height of 200 mm-325 mm, such as 225 mm-300 mm, and preferably 250 mm-275 mm. In some embodiments, the entire device (without being coupled to a gas container) may have an axial height of 50 mm-100 mm, such as 60 mm-90 mm, and preferably 77 mm-80 mm. In some embodiments, the entire device (without being coupled to a gas container) may may have a length (e.g., from check valve on the secondary inlet to end of the mouthpiece or mask) of 125 mm-250 mm, such as 130 mm-200 mm, such as 135 mm-175 mm. In some embodiments, the entire device (without being coupled to a gas container) may may have a width of 50 mm-125 mm, such as 60 mm-100 mm, such as 70 mm-90 mm.

Methods of delivery gas to a user or a treated person or patient may also be provided. The method may include providing a gas delivery device as disclosed herein to the user, treated person or patient. The method may include interacting with the selectable gas release component to cause the gas to be released from the portable gas container and to flow through the primary inlet port and out of the primary outlet port towards the user, treated person, or patient.

The method may include coupling a source of a gas to the secondary inlet port. The method may include decoupling the portable gas container from the device after the source of the gas has been coupled to the secondary inlet port.

When the device includes a mouthpiece and an adhesive on the mouthpiece, the method may include sealing, with the adhesive, the mouthpiece to skin around a mouth of the patient after the mouthpiece is inserted into the mouth of the patient. This may include, e.g., removing a liner from over the adhesive to allow the adhesive to contact the skin.

The method may include detaching the portable gas container from the primary inlet port of the device and attaching a different portable gas container to the primary inlet port. This may be repeated as necessary for two, three, four, or more changes of the portable gas container.

A method of treatment is also provided. The method may include providing a gas delivery device as disclosed herein, where there is a cap or a one-way valve coupled to the secondary inlet port. The method may include delivering rescue breaths to a patient through the secondary inlet port, either through the one-way valve or after removing the second cap. The method may include interacting with the selectable gas release component simultaneous with delivering rescue breaths in order to increase an amount of a breathable gas delivered to the patient.

A number of implementations have been described. Nevertheless, it will be understood that various modifications may be made without departing from the spirit and scope of the disclosure. Accordingly, other implementations are within the scope of the following claims.

What is claimed is:

1. A device for delivering gas to a user or a treated person or patient, comprising:

(A) a coupling portion configured to be directly coupled to a portable gas container;

(B) a manifold configured to be directly coupled to the coupling portion, the manifold including:

(i) a primary outlet port configured to direct a gas from the portable gas container towards the user or the treated person or patient;

(ii) a primary inlet port configured to allow the gas from the portable gas container to flow into manifold, the primary inlet port being in fluid communication with the primary outlet port;

(iii) a secondary inlet port configured to allow a secondary gas source to be coupled to the manifold, the secondary inlet port being in fluid communication with the primary outlet port; and (iv) an additional port in fluid communication with at least the primary inlet port and the primary outlet port;

(C) (i) a grommet seal and/or (ii) a disc valve or umbrella valve positioned at least partially within the primary inlet port; and (D) a selectable gas release component that is configured to controllably engage a valve of the portable gas container, the selectable gas release component extending through a sidewall of the manifold.

2. The device of claim 1, wherein the device comprises the grommet seal and wherein a portion of the selectable gas release component extending through a central opening of the grommet seal.

3. The device of claim 1, further comprising a first cap removably coupled to the additional port.

4. The device of claim 3, further comprising a second cap removably coupled to the secondary inlet port.

5. The device of claim 1, further comprising a patient interaction component operably coupled to the primary outlet port.

6. The device of claim 5, wherein the patient interaction component is directly coupled to the primary outlet port.

7. The device of claim 5, wherein the patient interaction component is indirectly coupled to the primary outlet port via a swiveling component coupled to the primary outlet port.

8. The device of claim 5, wherein the patient interaction component is a mouthpiece comprising adhesive disposed at or near a proximal end of the mouthpiece, such that when the mouthpiece is inserted into a mouth of the user or the treated person or patient, the adhesive can engage skin of the user or the treated person or patient to maintain a seal around the mouth.

9. The device of claim 8, further comprising a removable film disposed over adhesive on a surface facing away from the manifold.

10. The device of claim 5, wherein the patient interaction component is a mouthpiece, the device further comprising a spring-like feature configured to extend at least partially around the mouthpiece and cause the mouthpiece to be compressed in a first configuration or allow the mouthpiece to expand in a second configuration.

11. The device of claim 5, wherein the patient interaction component is a laryngeal mask airway (LMA) or oropharyngeal airway.

12. The device of claim 5, wherein the patient interaction component is a mask having a support backing and a flexible film, the support backing configured to be operably coupled to the primary outlet port and the flexible film is configured to be placed over a mouth and/or nose of the user or the treated person or patient, the mask defining an air pathway through the support backing to reach the mouth and/or nose of the user or the treated person or patient.

13. The device of claim 1, wherein the manifold is removably coupled to the coupling portion.

14. The device of claim 1, further comprising an O-ring between the manifold and the coupling portion.

15. The device of claim 1, wherein the manifold includes a first opening in the sidewall of the manifold at or near the primary inlet port for receiving an end of the selectable gas release component, a second opening in the sidewall opposite the first opening, the second opening configured to allow an intermediate portion of the selectable gas release component to pass through the sidewall.

16. The device of claim 1, further comprising a one-way valve removably coupled to the secondary inlet port.

17. The device of claim 1, further comprising a duckbill valve disposed within the primary outlet port.

18. The device of claim 1, further comprising a pressure gauge operably coupled to the primary outlet port.

19. The device of claim 1, further comprising a pressure relief valve operably coupled to the primary outlet port.

20. The device of claim 1, wherein the coupling portion includes a top portion defining an top opening having a first diameter, and a bottom portion defining an bottom opening having a second diameter, the second diameter being larger than the first diameter, wherein the bottom opening includes an engagement mechanism configured to engage the portable gas container to prevent the coupling portion from rotating relative to the portable gas container.

21. The device of claim 1, further comprising a Positive End Expiratory Pressure (PEEP) valve removably coupled to the additional port.

22. The device of claim 1, further comprising an O-ring disposed between the selectable gas release component and a valve stem of the portable gas container.

23. The device of claim 1, further comprising an oxygen port operably coupled to the manifold at or near the secondary inlet port, the oxygen port configured to be operably coupled to an oxygen supply.

24. The device of claim 1, further comprising a ventilation and/or respiration detector configured to indicate when ventilation and/or respiration has taken place.

25. The device of claim 1, wherein the device comprises:
- the coupling portion;
- the manifold;
- the grommet seal and/or the disc valve or umbrella valve;
- the selectable gas release component:
- a patient interaction component operably coupled to the primary outlet port;
- a first O-ring between the manifold and the coupling portion;
- a second O-ring disposed between the selectable gas release component and a valve stem of the portable gas container;
- a one-way valve removably coupled to the secondary inlet port;
- a duckbill valve disposed within the primary outlet port;
- a pressure gauge operably coupled to the primary outlet port;
- a pressure relief valve operably coupled to the primary outlet port;
- a Positive End Expiratory Pressure (PEEP) valve removably coupled to the additional port;
- an oxygen port operably coupled to the manifold at or near the secondary inlet port, the oxygen port configured to be operably coupled to an oxygen supply; and
- a ventilation and/or respiration detector configured to indicate when ventilation and/or respiration has taken place.

26. A method of delivering a gas to a user or a treated person or patient comprising:
- providing a device of claim 1 to the user or the treated person or patient; and
- interacting with the selectable gas release component to cause the gas to be released from the portable gas container and to flow through the primary inlet port and out of the primary outlet port towards the user or the treated person or patient.

27. The method of claim 26, further comprising coupling a source of a gas to the secondary inlet port, where the source of the gas comprises a manual resuscitator, a rescue-vehicle related system, or a hospital-based supply.

28. The method of claim 26, further comprising detaching the portable gas container from the primary inlet port of the device and attaching a second portable gas container to the primary inlet port.

29. A method of treatment, comprising:
- providing a device, the device comprising:
  - (A) a coupling portion configured to be directly coupled to a portable gas container;
  - (B) a manifold configured to be directly coupled to the coupling portion, the manifold including:
    - (i) a primary outlet port configured to direct a gas from the portable gas container towards a user or a treated person or patient;
    - (ii) a primary inlet port configured to allow the gas from the portable gas container to flow into manifold, the primary inlet port being in fluid communication with the primary outlet port;
    - (iii) a secondary inlet port configured to allow a secondary gas source to be coupled to the manifold, the secondary inlet port being in fluid communication with the primary outlet port; and
    - (iv) an additional port in fluid communication with at least the primary inlet port and the primary outlet port;
  - (C) a (i) grommet seal and/or (ii) a disc valve or umbrella valve positioned at least partially within the primary inlet port;
  - (D) a selectable gas release component that is configured to controllably engage a valve of the portable gas container, the selectable gas release component extending through a sidewall of the manifold; and
  - (E) optionally a first cap removably coupled to the additional port and/or a second cap or a one-way valve coupled to the secondary inlet port; and delivering rescue breaths to the user or a treated person or patient through the secondary inlet port, either through the one-way valve or after removing the second cap, wherein the rescue breaths are provided by a manual resuscitator.

30. The method of claim 29, further comprising interacting with the selectable gas release component simultaneous with delivering rescue breaths in order to increase an amount of a breathable gas delivered to the user or a treated person or patient.

* * * * *